US011423301B2

(12) United States Patent
O'Shea

(10) Patent No.: US 11,423,301 B2
(45) Date of Patent: Aug. 23, 2022

(54) LEARNING AND DEPLOYMENT OF ADAPTIVE WIRELESS COMMUNICATIONS

(71) Applicant: Virginia Tech Intellectual Properties, Inc., Blacksburg, VA (US)

(72) Inventor: Timothy James O'Shea, Arlington, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 741 days.

(21) Appl. No.: 16/281,246

(22) Filed: Feb. 21, 2019

(65) Prior Publication Data

US 2019/0188565 A1  Jun. 20, 2019

Related U.S. Application Data

(62) Division of application No. 15/970,324, filed on May 3, 2018, now Pat. No. 10,217,047.

(Continued)

(51) Int. Cl.
*G06N 3/08* (2006.01)
*G06N 3/04* (2006.01)

(52) U.S. Cl.
CPC ............. *G06N 3/08* (2013.01); *G06N 3/0445* (2013.01); *G06N 3/0454* (2013.01); *G06N 3/04* (2013.01); *G06N 3/082* (2013.01)

(58) Field of Classification Search
None
See application file for complete search history.

(56) References Cited

U.S. PATENT DOCUMENTS 5,386,199 A    1/1995  Yeom
6,104,991 A    8/2000  Newland et al.
(Continued)

FOREIGN PATENT DOCUMENTS

CN    106060852    10/2016
CN    106126807    11/2016

OTHER PUBLICATIONS

Dauphin, Y. N., de Vries, H., Chung, J. & Bengio, Y. RMSProp and equilibrated adaptive learning rates for non-convex optimization. arXiv preprint arXiv:1502.04390 (2015).
(Continued)

*Primary Examiner* — Alan Chen
(74) *Attorney, Agent, or Firm* — Fish & Richardson P.C.

(57) ABSTRACT

Methods, systems, and apparatus, including computer programs encoded on computer storage media, for training and deploying machine-learned communication over radio frequency (RF) channels. One method includes: determining an encoder and a decoder, at least one of which is configured to implement an encoding or decoding that is based on at least one of an encoder machine-learning network or a decoder machine-learning network that has been trained to encode or decode information over a communication channel; determining first information; using the encoder to process the first information and generate a first RF signal; transmitting, by at least one transmitter, the first RF signal through the communication channel; receiving, by at least one receiver, a second RF signal that represents the first RF signal altered by transmission through the communication channel; and using the decoder to process the second RF signal and generate second information as a reconstruction of the first information.

23 Claims, 9 Drawing Sheets

Related U.S. Application Data

(60) Provisional application No. 62/500,621, filed on May 3, 2017.

(56) References Cited

U.S. PATENT DOCUMENTS

| | | | |
|---|---|---|---|
| 6,307,895 | B1 | 10/2001 | Alexander et al. |
| 7,502,766 | B2 | 3/2009 | Dodgson |
| 8,494,464 | B1 | 7/2013 | Kadambe et al. |
| 10,217,047 | B2 | 2/2019 | O'Shea |
| 10,572,830 | B2 | 2/2020 | O'Shea |
| 10,643,153 | B2 | 5/2020 | O'Shea |
| 2004/0203826 | A1 | 10/2004 | Sugar et al. |
| 2006/0159126 | A1 | 7/2006 | Leow et al. |
| 2006/0243180 | A1 | 11/2006 | Sundermeyer et al. |
| 2009/0285270 | A1 | 11/2009 | Wong |
| 2010/0274433 | A1 | 10/2010 | Prokhorov et al. |
| 2012/0269234 | A1 | 10/2012 | Zhang et al. |
| 2016/0127907 | A1 | 5/2016 | Baxley et al. |
| 2016/0127931 | A1 | 5/2016 | Baxley et al. |
| 2017/0109650 | A1 | 4/2017 | Cevher |
| 2017/0163379 | A1 | 6/2017 | Ito |
| 2017/0331644 | A1* | 11/2017 | Urie ............... H04L 25/03057 |
| 2018/0091336 | A1 | 3/2018 | Mody et al. |
| 2018/0144241 | A1 | 5/2018 | Liu |
| 2018/0174050 | A1 | 6/2018 | Holt |
| 2018/0176232 | A1 | 6/2018 | Rodriguez |
| 2018/0177461 | A1 | 6/2018 | Bell |
| 2018/0308013 | A1 | 10/2018 | O'Shea |
| 2018/0314985 | A1 | 11/2018 | O'Shea |
| 2019/0268760 | A1 | 8/2019 | Tamura et al. |
| 2020/0265338 | A1 | 8/2020 | O'Shea |
| 2020/0334575 | A1 | 10/2020 | O'Shea |

OTHER PUBLICATIONS

Hinton, G. E. & Zemel, R. S. Autoencoders, minimum description length, and Helmholtz free energy. Advances in neural information processing systems, 3-3 (1994).

Jaderberg, M., Simonyan, K., Zisserman, A., et al. in Advances in Neural Information Processing Systems (2015), 2008-2016.

Kingma, D. & Ba, J. Adam: A method for stochastic optimization. arXiv preprint arXiv:1412.6980 (2014).

Masci, J., Meier, U., Cire,san, D. & Schmidhuber, J. in Artificial Neural Networks and Machine Learning—ICANN 2011 52-59 (Springer, 2011).

Oetting, J. A comparison of modulation techniques for digital radio. IEEE Transactions on communications 27, 1752-1762 (1979).

O'Shea, T. J., Corgan, J. & Clancy, T. C. Unsupervised Representation Learning of Structured Radio Communication Signals. arXiv preprint arXiv:1604.07078 (2016).

O'Shea, T. J., Pemula, L., Batra, D. & Clancy, T. C. Radio Transformer Networks: Attention Models for Learning to Synchronize in Wireless Systems. arXiv preprint arXiv:1605.00716 (2016).

Raviv, Y. & Intrator, N. Bootstrapping with noise: An effective regularization technique. Connection Science 8, 355-372 (1996).

Shannon, C. E. A Mathematical Theory of Communication. The Bell System Technical Journal 27, 3-55. ISSN: 1559-1662 (Jun. 1948).

Srivastava, N., Hinton, G., Krizhevsky, A., Sutskever, I. & Salakhutdinov, R. Dropout: A simple way to prevent neural networks from overfitting. The Journal of Machine Learning Research, 15, 1929-1958 (2014).

Vincent, P., Larochelle, H., Bengio, Y. & Manzagol, P.-A. in Proceedings of the 25th international conference on Machine learning (2008), 1096-1103.

Extended European Search Report in European Appln. No. 18793816.2, dated Dec. 18, 2020, 12 pages.

O'Shea et al., "Learning to Communicate: Channel Auto-encoders, Domain Specific Regularizers, and Attention," IEEE International Symposium on Signal Processing and Information Technology (ISSPIT), 2016, 10 pages.

Le, "A tutorial on deep learning part 2: autoencoders, convolutional neural networks and recurrent neural networks," Google Brain, Google Inc., Oct. 20, 2015, 1-20.

O'Shea et al. "An introduction to machine learning communications systems," Computer Science, ArXIV, Feb. 2, 2017, 1-10.

PCT International Preliminary Report on Patent in International Appln. No. PCT/US2018/030876, dated Nov. 14, 2019, 12 pages.

PCT International Search Report in International Appln. No. PCT/US2018/030876, dated Jul. 9, 2018, 13 pages.

Baldi et al., "Complex-Valued Autoencoders," Neural Network (preprint), Mar. 18, 2014, 35 pages.

C. Clancy, J. Hecker, E. Stuntebeck, and T. O'Shea, "Applications of machine learning to cognitive radio networks", Wireless Communications, IEEE, vol. 14, No. 4, pp. 47-52, Aug. 2007.

Extended European Search Report in European Appln. No. 18791666.3, dated Dec. 8, 2020, 10 pages.

E. S. Sousa and S. Pasupathy, "Pulse shape design for teletext data transmission", Communications, IEEE Transactions on, vol. 31, No. 7, pp. 871-878, Jul. 1983.

F. Chollet, Keras, URL<https://github.com/fchollet/keras>, 2015, 39 pages.

Guo et al., "Improved radiofrequency identification indoor localization method via radial basis function neural network," Mathematical Problems in Engineering, Jul. 2014, 10 pages.

Lee et al., "Efficient sparse coding algorithms," in Advances in neural information processing systems, Nov. 2006, pp. 801-808.

Migliori et al., "Biologically Inspired Radio Signal Feature Extraction with Sparse Denoising Autoencoders," arXiv, May 17, 2016, 12 pages.

O'Shea., "Convolutional Radio Modulation Recognition Networks," Engineering Applications of Neural Networks, Sep. 2016, 15 pages.

Srivastava, et al., "Dropout: A Simple Way to Prevent Neural Networks from Overtting," Journal of Machine Learning Research 15, Jun. 14, 2014 1929-1958, 30 pages.

PCT International Preliminary Report on Patentability in International Appln. No. PCT/US2018/029148, dated Nov. 7, 2019, 10 pages.

PCT International Search Report and Written Opinion in International Appl. PCT/US2018/29148, dated Aug. 10, 2018, 17 pages.

Theis et al., "Lossy Image Compression with Compressive Autoencoders," arXiv, Mar. 2017, 19 pages.

PCT Invitation to Pay Additional Fees in International Appln. PCT/US2018/29148, dated Jun. 15, 2018, 2 pages.

Popoola et al., "Effect of Training Algorithms on Performance of a Developed Automatic Modulation Classification Using Artificial Neural Network," IEEE, Sep. 2013, 6 pages.

Sklar, Digital communications Fundamentals and Applications, 2nd ed., Jan. 2017, Table of Contents, 17 pages.

Vincent et al., "Extracting and Composing Robust Features with Denoising Autoencoders," Proceedings of the 25th international conference on Machine learning, Jul. 2008, 8 pages.

Xie and Beni, "A validity measure for fuzzy clustering," IEEE Transactions on Pattern Analysis & Machine Intelligence, 1991, 8: 841-847.

\* cited by examiner

LEARNING AND DEPLOYMENT OF ADAPTIVE WIRELESS COMMUNICATIONS

CROSS-REFERENCE TO RELATED APPLICATION

This application is a divisional of U.S. application Ser. No. 15/970,324, filed May 3, 2018, now allowed, which claims priority to U.S. Provisional Application No. 62/500,621 filed on May 3, 2017. The disclosures of the prior applications are considered part of and is incorporated by reference in the disclosure of this application.

TECHNICAL FIELD

The present disclosure relates to machine learning and deployment of adaptive wireless communications, and in particular for radio frequency (RF) signals.

BACKGROUND

Radio frequency (RF) waveforms are prevalent in many systems for communication, storage, sensing, measurements, and monitoring. RF waveforms are transmitted and received through various types of communication media, such as over the air, under water, or through outer space. In some scenarios, RF waveforms transmit information that is modulated onto one or more carrier waveforms operating at RF frequencies. In other scenarios, RF waveforms are themselves information, such as outputs of sensors or probes. Information that is carried in RF waveforms is typically processed, stored, and/or transported through other forms of communication, such as through an internal system bus in a computer or through local or wide-area networks.

SUMMARY

In general, the subject matter described in this disclosure can be embodied in methods, apparatuses, and systems for training and deploying machine-learning networks to communicate over RF channels, and specifically to encode and decode information for communication over RF channels.

In one aspect, a method is performed by at least one processor to train at least one machine-learning network to communicate over an RF channel The method includes: determining first information; using an encoder machine-learning network to process the first information and generate a first RF signal for transmission through a communication channel; determining a second RF signal that represents the first RF signal having been altered by transmission through the communication channel; using a decoder machine-learning network to process the second RF signal and generate second information as a reconstruction of the first information; calculating a measure of distance between the second information and the first information; and updating at least one of the encoder machine-learning network or the decoder machine-learning network based on the measure of distance between the second information and the first information. Other implementations of this aspect include corresponding computer systems, apparatus, and computer programs recorded on one or more computer storage devices, each configured to cause at least one operably connected processor to perform the actions of the methods.

Implementations may include one or more of the following features. The method where updating at least one of the encoder machine-learning network or the decoder machine-learning network based on the measure of distance between the second information and the first information includes: determining an objective function including the measure of distance between the second information and the first information; calculating a rate of change of the objective function relative to variations in at least one of the encoder machine-learning network or the decoder machine-learning network; selecting, based on the calculated rate of change of the objective function, at least one of a first variation for the encoder machine-learning network or a second variation for the decoder machine-learning network; and updating at least one of the encoder machine-learning network or the decoder machine-learning network based on the at least one of the selected first variation for the encoder machine-learning network or the selected second variation for the decoder machine-learning network. The method where the measure of distance between the second information and the first information includes at least one of (i) a cross-entropy between the second information and the first information, or (ii) a geometric distance metric between the second information and the first information. The method where updating at least one of the encoder machine-learning network or the decoder machine-learning network includes at least one of: updating at least one encoding network weight or network connectivity in one or more layers of the encoder machine-learning network, or updating at least one decoding network weight or network connectivity in one or more layers of the decoder machine-learning network. The method where updating at least one of the encoder machine-learning network or the decoder machine-learning network further includes: determining a channel mode, from among a plurality of channel modes, that represents a state of the communication channel; and updating at least one of the encoder machine-learning network or the decoder machine-learning network based on the channel mode of the communication channel. The method where the encoder machine-learning network and the decoder machine-learning network are jointly trained as an auto-encoder to learn communication over a communication channel, and wherein the auto-encoder includes at least one channel-modeling layer representing effects of the communication channel on transmitted waveforms. The method where the at least one channel-modeling layer represents at least one of (i) additive Gaussian thermal noise in the communication channel, (ii) delay spread caused by time-varying effects of the communication channel, (iii) phase noise caused by transmission and reception over the communication channel, or (iv) offsets in phase, frequency, or timing caused by transmission and reception over the communication channel. The method where at least one of the encoder machine-learning network or the decoder machine-learning network includes at least one of a deep dense neural network (DNN), a convolutional neural network (CNN), or a recurrent neural network (RNN) including parametric multiplications, additions, and non-linearities. The method, further including: processing the first RF signal to generate a first analog RF waveform that is input into the communication channel; receiving a second analog RF waveform as an output of the communication channel that represents the first analog RF waveform having been altered by the communication channel; and processing the second analog RF waveform to generate the second RF signal. The method where the communication channel includes at least one of a radio communication channel, an acoustic communication channel, or an optical communication channel. Implementations of the described techniques may include hardware, a method or process, or computer software on a computer-accessible medium.

In another aspect, a method is performed by at least one processor to deploy a learned communication system over an RF channel. The method includes: determining an encoder and a decoder, at least one of which is configured to implement an encoding or decoding that is based on at least one of an encoder machine-learning network or a decoder machine-learning network that has been trained to encode or decode information over a communication channel; determining first information; using the encoder to process the first information and generate a first RF signal; transmitting, by at least one transmitter, the first RF signal through the communication channel; receiving, by at least one receiver, a second RF signal that represents the first RF signal altered by transmission through the communication channel; and using the decoder to process the second RF signal and generate second information as a reconstruction of the first information. Other implementations of this aspect include corresponding computer systems, apparatus, and computer programs recorded on one or more computer storage devices, each configured to cause at least one operably connected processor to perform the actions of the methods.

Implementations may include one or more of the following features. The method, further includes: determining feedback information that indicates at least one of (i) a measure of distance between the second information and the first information, or (ii) channel state information regarding the communication channel; and updating at least one of the encoder or the decoder based on the feedback information. The method where updating at least one of the encoder or the decoder based on the feedback information further includes: determining a channel mode, from among a plurality of channel modes, that represents a state of the communication channel based on the feedback information; and updating at least one of the encoder or the decoder based on the channel mode of the communication channel. The method where the encoder implements an encoding mapping that is based on results of training an encoder machine-learning network and the decoder implements a decoding mapping that is based on results of training a decoder machine-learning network, and where the encoder machine-learning network and the decoder machine-learning network have been jointly trained as an auto-encoder to learn communication over a communication channel. The method, further includes: processing the first RF signal to generate a first analog RF waveform; using one or more transmit antennas to transmit the first analog RF waveform over the communication channel; using one or more receive antennas to receive a second analog RF waveform that represents the first analog RF waveform having been altered by the communication channel; and processing the second analog RF waveform to generate the second RF signal. Implementations of the described techniques may include hardware, a method or process, or computer software on a computer-accessible medium.

Another aspect includes a system including: at least one processor; and at least one computer memory coupled to the at least one processor having stored thereon instructions which, when executed by the at least one processor, cause the at least one processor to perform operations including: determining first information; using an encoder machine-learning network to process the first information and generate a first RF signal for transmission through a communication channel; determining a second RF signal that represents the first RF signal having been altered by transmission through the communication channel; using a decoder machine-learning network to process the second RF signal and generate second information as a reconstruction of the first information; calculating a measure of distance between the second information and the first information; and updating at least one of the encoder machine-learning network or the decoder machine-learning network based on the measure of distance between the second information and the first information. Other implementations of this aspect include corresponding computer systems, apparatus, and computer programs recorded on one or more computer storage devices, each configured to cause at least one operably connected processor to perform the actions of the methods.

Implementations may include one or more of the following features. The system where updating at least one of the encoder machine-learning network or the decoder machine-learning network based on the measure of distance between the second information and the first information includes: determining an objective function including the measure of distance between the second information and the first information; calculating a rate of change of the objective function relative to variations in at least one of the encoder machine-learning network or the decoder machine-learning network; selecting, based on the calculated rate of change of the objective function, at least one of a first variation for the encoder machine-learning network or a second variation for the decoder machine-learning network; and updating at least one of the encoder machine-learning network or the decoder machine-learning network based on the at least one of the selected first variation for the encoder machine-learning network or the selected second variation for the decoder machine-learning network. The system where the measure of distance between the second information and the first information includes at least one of (i) a cross-entropy between the second information and the first information, or (ii) a geometric distance metric between the second information and the first information. The system where updating at least one of the encoder machine-learning network or the decoder machine-learning network includes at least one of: updating at least one encoding network weight or network connectivity in one or more layers of the encoder machine-learning network, or updating at least one decoding network weight or network connectivity in one or more layers of the decoder machine-learning network. The system where updating at least one of the encoder machine-learning network or the decoder machine-learning network further includes: determining a channel mode, from among a plurality of channel modes, that represents a state of the communication channel; and updating at least one of the encoder machine-learning network or the decoder machine-learning network based on the channel mode of the communication channel. The system where the encoder machine-learning network and the decoder machine-learning network are jointly trained as an auto-encoder to learn communication over a communication channel, and where the auto-encoder includes at least one channel-modeling layer representing effects of the communication channel on transmitted waveforms. The system where the at least one channel-modeling layer represents at least one of (i) additive Gaussian thermal noise in the communication channel, (ii) delay spread caused by time-varying effects of the communication channel, (iii) phase noise caused by transmission and reception over the communication channel, or (iv) offsets in phase, frequency, or timing caused by transmission and reception over the communication channel. The system where at least one of the encoder machine-learning network or the decoder machine-learning network includes at least one of a deep dense neural network (DNN) a convolutional neural network (CNN), or a recurrent neural network (RNN)

including parametric multiplications, additions, and non-linearities. The system where the operations further include: processing the first RF signal to generate a first analog RF waveform that is input into the communication channel; receiving a second analog RF waveform as an output of the communication channel that represents the first analog RF waveform having been altered by the communication channel; and processing the second analog RF waveform to generate the second RF signal. The system where the communication channel includes at least one of a radio communication channel, an acoustic communication channel, or an optical communication channel. Implementations of the described techniques may include hardware, a method or process, or computer software on a computer-accessible medium.

Another aspect includes a system including: at least one processor; and at least one computer memory coupled to the at least one processor having stored thereon instructions which, when executed by the at least one processor, cause the at least one processor to perform operations including: determining an encoder and a decoder, at least one of which is configured to implement an encoding or decoding that is based on at least one of an encoder machine-learning network or a decoder machine-learning network that has been trained to encode or decode information over a communication channel; determining first information; using the encoder to process the first information and generate a first RF signal; transmitting, by at least one transmitter, the first RF signal through the communication channel; receiving, by at least one receiver, a second RF signal that represents the first RF signal altered by transmission through the communication channel; and using the decoder to process the second RF signal and generate second information as a reconstruction of the first information. Other implementations of this aspect include corresponding computer systems, apparatus, and computer programs recorded on one or more computer storage devices, each configured to cause at least one operably connected processor to perform the actions of the methods.

Implementations may include one or more of the following features. The system where the operations further include: determining feedback information that indicates at least one of (i) a measure of distance between the second information and the first information, or (ii) channel state information regarding the communication channel; and updating at least one of the encoder or the decoder based on the feedback information. The system where updating at least one of the encoder or the decoder based on the feedback information further includes: determining a channel mode, from among a plurality of channel modes, that represents a state of the communication channel based on the feedback information; and updating at least one of the encoder or the decoder based on the channel mode of the communication channel. The system where the encoder implements an encoding mapping that is based on results of training an encoder machine-learning network and the decoder implements a decoding mapping that is based on results of training a decoder machine-learning network, and where the encoder machine-learning network and the decoder machine-learning network have been jointly trained as an auto-encoder to learn communication over a communication channel. The system where the operations further include: processing the first RF signal to generate a first analog RF waveform; using one or more transmit antennas to transmit the first analog RF waveform over the communication channel; using one or more receive antennas to receive a second analog RF waveform that represents the first analog RF waveform having been altered by the communication channel; and processing the second analog RF waveform to generate the second RF signal. Implementations of the described techniques may include hardware, a method or process, or computer software on a computer-accessible medium.

Other implementations of this and other aspects include corresponding systems, apparatuses, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Figure 1:
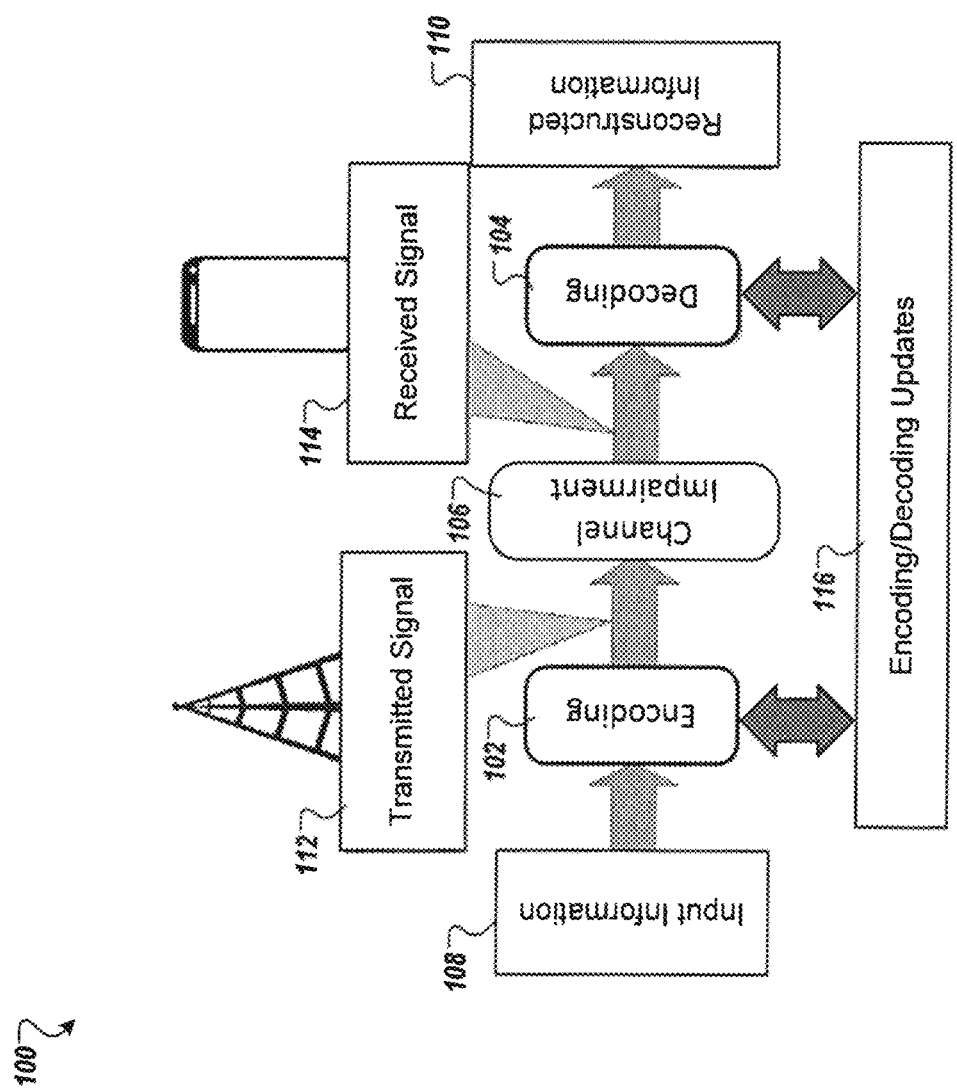
FIG. 1 illustrates an example of a radio frequency (RF) system that implements a machine-learning encoder and decoder to perform learned communication over one or more RF channels.

Systems and techniques are disclosed herein that enable machine learning and deployment of communication over an impaired RF channel. In some implementations, at least one machine-learning network is trained to encode information as a signal that is transmitted over a radio transmission channel, and to decode a received signal to recover the original information. The training may be designed to achieve various criteria, such as low bit error rate, low power, low bandwidth, low complexity, performing well in particular regimes such as at a low signal to noise (SNR) ratio or under specific types of channel fading or interference, and/or other criteria. The results of training such machine-learning networks may then be utilized to deploy real-world encoders and decoders in communication scenarios to encode and decode information over various types of RF communication media. In some implementations, further learning and adaptation of the encoder and decoder may be implemented during deployment, based on feedback information. These encoders and decoders may replace or augment one or more signal processing functions such as modulation, demodulation, mapping, error correction, or other components which exist in those systems today.

The disclosed implementations present a novel approach to how digital radio systems are designed and deployed for radio communications applications. For example, the disclosed implementations may help improve a typically slow and incremental process of radio signal processing engineering, and instead enable a new way of designing, constructing, and realizing radio communications systems. By implementing machine-learning networks that may be trained to learn suitable encoding and decoding techniques for different types of communication media, techniques disclosed herein offer various advantages, such as improved power, resiliency, and complexity advantages over presently available systems. In some scenarios, this can be especially important for communications channels which have very complex sets of effects which are hard to model, or hard to optimize for using other approaches.

Implementations disclosed herein may be applied to a wide range of radio communication systems, such as cellular, satellite, optical, acoustic, physical, emergency handheld, broadcast, point-to-point, Wi-Fi, Bluetooth, and other forms of radio that undergo transmission impairments. Channel impairments may include, for example, thermal noise, such as Gaussian-like noise, to more complex impairments such as multi-path fading, impulse noise, spurious or continuous jamming, interference, distortion, hardware effects, and other impairments.

The encoder and decoder may implement encoding and decoding technique that are learned from one or more machine-learning networks that have been trained to learn suitable input-output encoding and decoding mappings based on one or more objective criteria. For example, the machine-learning networks may be artificial neural networks. During training, the machine-learning networks may be adapted through selection of model architecture, weights, and parameters in the encoder and/or the decoder to learn encoding and decoding mappings. The encoding and decoding machine-learning networks may be trained jointly or may be trained iteratively.

For example, an encoder machine-learning network and decoder machine-learning network may be implemented as an autoencoder, in which the encoder network and decoder network are jointly optimized. In some implementations, the autoencoder may be trained by modeling the effects of an impaired channel as one or more channel-modeling layers, such as stochastic layers which may include regularization layers (e.g. regularization layers, transforming layers, variational layers/samplers, noise layers, mixing layers, etc.) in the autoencoder network or as another set of differentiable functions representing the behavior of a wireless channel. The layers that model the channel may form a regularization function across random behavior of a channel.

During training, an encoder machine-learning network and decoder machine-learning network may be trained to perform unsupervised, or partially supervised, machine learning to determine techniques for transmitting and receiving information over an impaired channel. Therefore, in some scenarios, rather than being reliant upon pre-designed systems for error correction, modulation, pre-coding, and shaping, the disclosed implementations herein may adaptively learn techniques for encoding information into waveforms that are transmitted over a channel, as well as techniques for decoding received waveforms into reconstructed information. The encoder machine-learning network and/or decoder machine-learning network may be trained on real or simulated channel conditions. Encoders and/or decoders that utilize results of training such machine-learning networks may further be updated during deployment, thus providing advantages in adapting to different types of wireless system requirements, and in some cases improving the throughput, error rate, complexity, and power consumption performance of such systems.

As such, regardless of the type of RF channel or RF channel impairment, implementations disclosed herein can provide broadly applicable techniques for learning representations of information that enable reliable communication over impaired RF channels. Depending on the configuration of the training system and data sets and channel models used, such machine-learning communication techniques can specialize in performance for a narrow class of conditions, signal or channel types, or may generalize and optimize performance for a wide range of signal or channel types or mixtures of one or more signals or channels.

FIG. 1 illustrates an example of a radio frequency (RF) system 100 that implements an encoder and decoder to perform learned communication over one or more RF channels. The system 100 includes both an encoder 102 and a decoder 104 that implement encoding and decoding techniques that were learned by machine learning networks to communicate over an impaired RF channel 106.

In scenarios of training, the encoder 102 include a machine-learning network that learns how to represent the input information 108 as a transmitted signal 112 for transmission over the channel 106. Analogously, during training, the decoder 104 includes a machine-learning network that learns how to decode a received signal 114 into reconstructed information 110 that approximates the original input information 108. During training, the encoder 102 and/or decoder 104 may be trained by a network update process 116. The encoder 102 and decoder 104 may be trained to achieve various types of objective functions, such as a measure of reconstruction error, a measure of computational complexity, bandwidth, latency, power, or various combinations therefor and other objectives. Further details of training are described below, for example with reference to FIG. 3.

In scenarios of deployment, the encoder 102 and decoder 104 may implement encoding and decoding techniques that were previously learned from training, or may be (further) trained during deployment. The encoder 102 and decoder 104 may be deployed in various application scenarios to perform communication, using the encoding and decoding representations that were learned during training. In some implementations, the encoder 102 and/or decoder 104 may be further updated during deployment based on real-time performance results such as reconstruction error, power consumption, delay, etc. Further details of deployment are described below, for example with reference to FIG. 7. In these cases, error feedback of loss functions may occur in some instances via a communications bus, or a protocol message within the wireless system which can be used to update the encoder 102 and/or decoder 104, along with information to help characterize the response of the channel 106.

The input information 108 and reconstructed information 110 may be any suitable form of information that is to be communicated over a channel, such as a stream of bits, packets, discrete-time signals, or continuous-time waveforms. Implementations disclosed herein are not limited to any particular type of input information 108 and reconstructed information 110, and are generally applicable to learn encoding and decoding techniques for communicating a wide variety of types of information over the RF channel 106.

In some implementations, the encoder 102 and decoder 104 employ one or more signal processing operations, which are suited to the type of RF communication domain. As examples, the encoder 102 and/or decoder may implement filtering, modulation, analog-to-digital (A/D) or digital-to-analog (D/A) conversion, equalization, or other signal processing methods that may be suitable for a particular types of RF signals or communication domains. In some implementations, the encoder 102 and/or decoder 104 may implement one or more transmit and receive antennas, and other hardware or software suitable for transmitting signals 112 and receiving signals 114 over the RF channel 106.

Therefore, in such scenarios, as shown in the example of FIG. 1, the transmitted signal 112 and received signal 114 may represent actual RF waveforms that are transmitted and received over the RF channel 106 through one or more antennas. Thus, the encoder 102 and decoder 104 represent generalized mappings between information 108/110 and RF waveforms 112/114.

By contrast, in some implementations, the system 100 may implement signal processing and RF transmission/reception processes separately from the encoder 102 and decoder 104. In such implementations, one or more signal transmission and/or signal reception components, such as filtering, modulation, A/D or D/A conversion, single or multiple antennas, etc., may be represented as part of the channel 106. The impairments in the channel 106 may therefore include transmitter/receiver effects, such as filtering impairments, additive noise, or other impairments in the transmitter and/or receiver components. Therefore, in such scenarios, the transmitted signal 112 and received signal 114 represent intermediate representations of information 108/110, and the channel 106 represents a general transformation of those intermediate representations of information to and from actual RF waveforms that are transmitted and received over an RF medium. For example, the transmitted signal 112 and received signal 114 may represent basis coefficients for RF waveforms, time-domain samples of RF waveforms, distributions over RF waveform values, or other intermediate representations that may be transformed to and from RF waveforms.

In scenarios of training, the reconstructed information 110 may be compared with the original information 108, and the encoder 102 and/or the decoder 104 may be trained (updated) based on results of the reconstruction. In some implementations, updating the encoder 102 and/or decoder 104 may also be based on other factors, such as computational complexity of the machine-learning networks (which can be measured, for example, by the number of parameters, number of multiplies/adds, execution time, Kolmogorov complexity, or otherwise), transmission bandwidth or power used to communicate over the channel 106, or various combinations thereof and other metrics.

In some implementations, the encoder 102 and the decoder 104 may include artificial neural networks that consist of one or more connected layers of parametric multiplications, additions, and non-linearities. In such scenarios, updating the encoder 102 and/or decoder 104 may include updating weights of the neural network layers, or updating connectivity in the neural network layers, or other modifications of the neural network architecture, so as to modify a mapping of inputs to outputs.

The encoder 102 and the decoder 104 may be configured to encode and decode using any suitable machine-learning technique. In general, the encoder 102 may be configured to learn a mapping from input information 108 into a lower-dimensional or higher-dimensional representation as the transmitted signal 112. Analogously, the decoder 104 may be configured to learn a reverse mapping from a lower-dimensional or higher-dimensional received signal 114 into the reconstructed information 110.

As an example, the mappings that are implemented in the encoder 102 and decoder 104 may involve learning a set of basis functions for RF signals. In such scenarios, for a particular set of basis functions, the encoder 102 may transform the input information 108 into a set of basis coefficients corresponding to those basis functions, and the basis coefficients may then be used to generate a transmitted RF waveform (for example, by taking a weighted combination of the basis functions weighted by the basis coefficients). Analogously, the decoder 104 may generate the reconstructed information 110 by generating a set of basis coefficients from a received RF waveform (for example by taking projections of the received RF waveform onto the set of basis functions). The basis functions themselves may be any suitable orthogonal or non-orthogonal set of basis functions, subject to appropriate constraints on energy, amplitude, bandwidth, or other conditions.

During deployment, in some implementations, the encoder 102 and/or decoder 104 may utilize simplified encoding and decoding techniques based on results of training machine-learning networks. For example, the encoder 102 and/or decoder 104 may utilize approximations or compact look up tables based on the learned encoding/decoding mappings. In such deployment scenarios, the encoder 102 and/or decoder 104 may implement more simplified structures, rather than a full machine-learning network. For example, techniques such as distillation may be used to train smaller machine-learning networks which perform the same signal processing function. Further discussion of such deployment scenarios is provided in regards to FIG. 7, below.

In some implementations, the encoder 102 and/or decoder 104 may include one or more fixed components or algorithms that are designed to facilitate communication over RF channels, such as expert synchronizers, equalizers, etc. As such, during training, the encoder 102 and/or decoder 104 may be trained to learn encoding/decoding techniques that are suitable for such fixed components or algorithms.

RF signals that are transmitted and received by system 100 may include any suitable radio-frequency signal, such as acoustic signals, optical signals, or other analog waveforms. The spectrum of RF signals that are processed by system 100 may be in a range of 1 kHz to 300 GHz. For example, such RF signals include very low frequency (VLF) RF signals between 1 kHz to 30 kHz, low frequency (LF) RF signals between 30 kHz to 300 kHz, medium frequency (MF) RF signals between 300 kHz to 1 MHz, high frequency (HF) RF signals between 1 MHz to 30 MHz, and higher-frequency RF signals up to 300 GHz.

Figure 2:
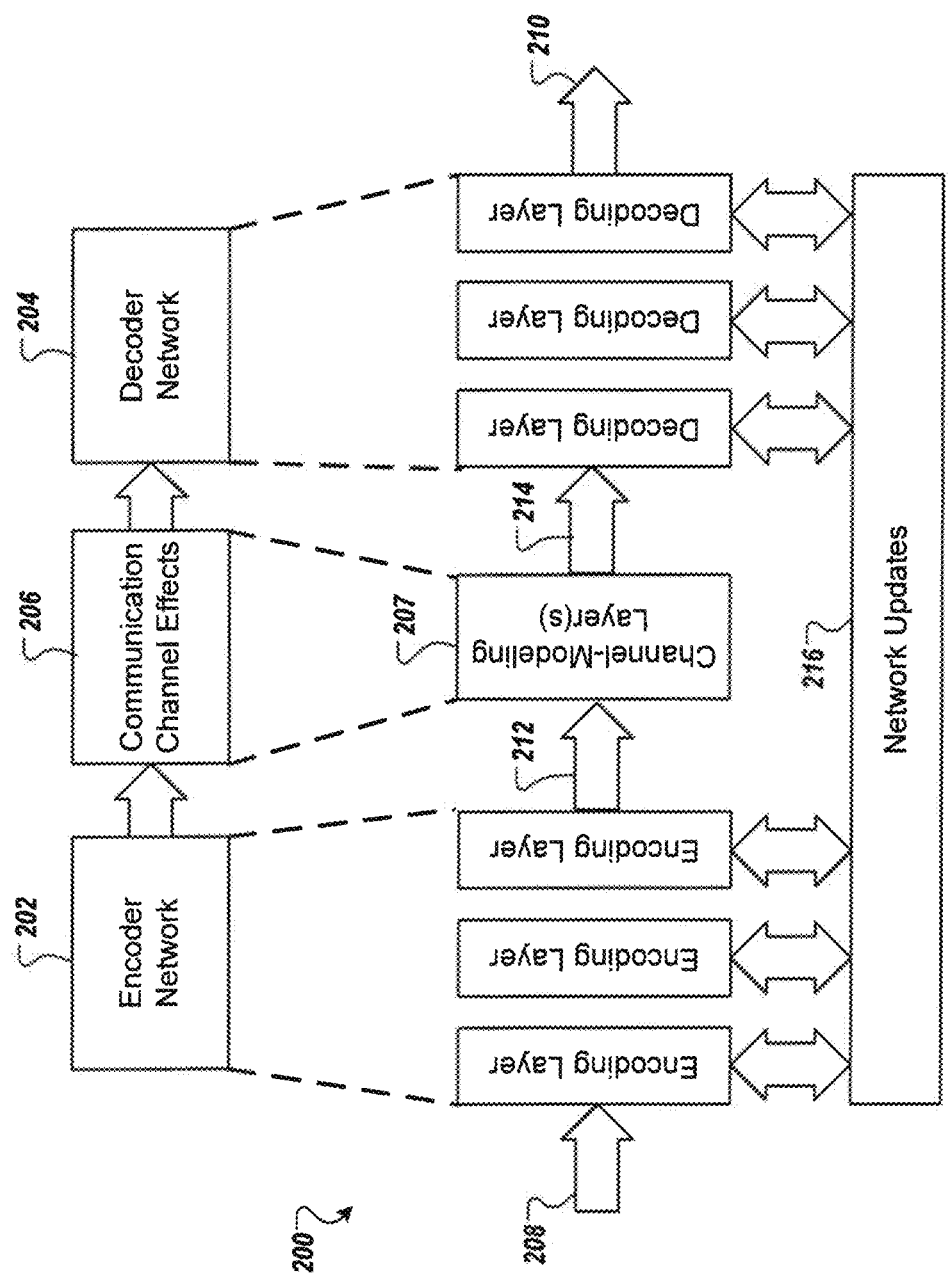
FIG. 2 illustrates an example of a network structure of machine-learning encoder and decoder networks that may be implemented in an RF system to perform learned communication over RF channels.

FIG. 2 illustrates an example of a network structure 200 of machine-learning encoder network and decoder networks that may be implemented in an RF system to perform learned communication over RF channels.

The network structure 200 uses one or more layers that form an encoder network 202 and a decoder network 204. The output of each layer is used as input to the next layer in the network. Each layer of the network generates an output from a received input in accordance with current values of a respective set of parameters. For example, in some implementations, the encoder network 202 and/or decoder network 204 may include a plurality of networks that may be collectively or iteratively trained. As such, the network input 208 in FIG. 2 may be the original information (e.g., input information 108 in FIG. 1, above), or may be an output of previous one or more layers in the encoder network 204. Analogously, the network output 210 may represent the reconstructed information (e.g., reconstructed information 110 in FIG. 1, above), or may be an input into subsequent one or more layers in the decoder network 204. In some instances, networks may not be sequential in nature, leveraging connections between various layers or neurons which bypass or route through a plurality of possible architectures.

During training, the encoder network 202 and/or decoder network 204 may be trained to learn encoding and/or decoding techniques for communicating over various types of RF channels. During deployment, the encoder network 202 and/or decoder network 204 (having been trained) may be implemented in an encoder and/or decoder. Alternatively, in some scenarios of deployment, a deployed encoder and decoder may utilize simplified encoding and decoding mapping based on results of training the encoder network 202 and/or decoder network 204. In the latter scenario, the encoder network 202 and/or decoder network 204 is only utilized during training, and provide learned encoding and/or decoding techniques that may be utilized in more simplified encoders and decoders that are deployed in real-world systems. Further discussion of such simplified deployment scenarios is provided in regards to FIG. 7, below.

In the example of FIG. 2, the encoder network 202 and decoder network 204 are implemented using a neural network structure 200 that is configured as an autoencoder. In the scenario of an autoencoder structure, the encoder and decoder are jointly trained to learn best representations of information for communication over the channel 206. In general, however, the network structure 200 may be configured as separate networks in the encoder network 202 and decoder network 204, which may be jointly or iteratively trained. During training, the encoder network 202 and/or decoder network 204 may be updated by a network update process 216.

In general, the encoder network 202 and/or decoder network 204 may include one or more collections of multiplications, divisions, and summations or other operations of inputs and intermediate values, optionally followed by non-linearities (such as rectified linear units, sigmoid function, or otherwise) or other operations (e.g., normalization), which may be arranged in a feed-forward manner or in a manner with feedback and in-layer connections (e.g., a recurrent neural network (RNN) where sequences of training information may be used in some instances). For example, a recurrent neural network may be a long-short term memory (LSTM) neural network that includes one or more LSTM memory blocks, or a quasi-recurrent neural network (QRNN) which combines elements of convolutional networks with recurrent networks.

Parameters and weight values in the network may be used for a single multiplication, as in a fully connected deep dense neural network (DNN), or they may be "tied" or replicated across multiple locations within the network to form one or more receptive fields, such as in a convolutional neural network, a dilated convolutional neural network, a residual network unit, or similar. A collection of one or more of these layers may constitute both the encoder 202 and the decoder 204, as shown in the example of FIG. 2. The specific structure for the networks may be explicitly specified at design time, or may be selected from a plurality of possible architecture candidates to ascertain the best performing candidate.

In some implementations, the encoder network 202 may include an output layer that includes a linear regression layer. The decoder network 204 may include at least one of (i) an output layer that includes a linear layer for regression of reconstructed information 210 in decoding the received RF signal 214, or (ii) a sigmoid or hard-sigmoid activation layer for probability regression or slicing of the received RF signal 214, or (iii) an activation of a combination of sigmoid expressions such as a SoftMax or hierarchical SoftMax which can compute a probabilistic expression such as a pseudo-likelihood of a discrete message or set of bits.

In some implementations, the encoder network 202 and/or decoder network 204 may include one or more layers that implement fixed communications algorithms, such as synchronization, equalization, etc. As such, in some scenarios, the encoder network 202 and/or decoder network 204 may be trained and deployed to learn suitable encoding and/or decoding techniques based on such fixed layers in the networks. Therefore, in general, the network structure 200 disclosed herein enables flexible design and training of the encoder network 202 and decoder network 204, for example by incorporating one or more existing communication algorithms that may be deployed in real-world systems in conjunction with machine-learning techniques to optimize around those fixed algorithms.

The example of FIG. 2 shows only one possible implementation of a network structure that may be implemented. In general, implementations are not limited to these specific types of layers, and other configurations of layers and non-linearities may be used, such as dense, fully connected, and/or DNN layers, including rectified linear-unit (ReLU), sigmoid, tan h, and others. The network structure 200 uses these layers to predict an output 210 for a received input 208. In some implementations, a linear regression layer may be implemented on the output of the encoder 202 and a linear layer on the output of the decoder 204 (for soft decoding), or a hard-sigmoid activation on the output of the decoder 204 (for hard decoding).

A transmitted signal 212, created by the encoder 202, may be the actual RF waveform in analog form, or may be a series of radio samples in time, frequency, or any other signal representation basis, or may be an intermediate representation (e.g., RF samples, basis coefficients, distributions over RF waveform values, etc.), for mapping the input information 208 into an RF waveform for transmission over the channel 206. Analogously, the received signal 214 may be the actual received RF waveform in analog form, or may be an intermediate representation (e.g., RF samples, basis coefficients, distributions over RF waveform values, etc.), for mapping a received RF waveform into the reconstructed information 210. For example, in the scenario where the encoder 202 and decoder 204 are implemented as a variational auto-encoder, the transmitted RF signal 212 and received RF signal 214 may represent distributions over RF waveform values.

The network structure 200 may also include one or more channel-modeling layers 207, which may be stochastic layers (e.g., regularization layers). In some instances, the channel-modeling layers 207 may have at least one of weight regularization on convolutional network layer weights, activity regularization on dense network layer activations, or other stochastic impairments on activations or weights, such as dropout. In some instances, or in addition to these, the layers may perform additional approximation of non-linearities present in a channel system (such as amplifier or RF component behaviors), or they may leverage variational layers such as sampling from a random distribution specified by or parameterized by weights or activations.

In some implementations, the channel-modeling layer(s) 207 may model impairment effects in the channel 206, which may be include various types of impairments in an RF medium and/or transmission and reception components. Such channel-modeling layers 207 may be implemented during training of the network structure 200, in which case the channel-modeling layer(s) 207 may be implemented as one or more layers in an overall auto-encoder structure to represent impairment effects of the channel 206. During evaluation or deployment over a real RF channels, the channel 206 would be a real-world communication channel (including possible transmitter and/or receiver effects), and the corresponding channel-modeling layers 207 would be removed from deployment, with only the network layers of the encoder 202 and the decoder 204 being deployed on the real channel 206.

In general, however, channel-modeling layers 207 may be implemented for various in different parts of the network structure 200 for various reasons, such as to prevent overfitting, or to implement dropout, such as a penalty on the convolutional layer weights, to encourage minimum energy bases, or to implement a penalty on dense layer activations to encourage sparsity of solutions, or to improve generalization of the system to unseen conditions or channel states or behaviors.

In scenarios of using channel-modeling layer(s) 207 to model the channel 206 during training, the network structure 200 may implement domain-specific regularization to model RF channel impairment effects. For example, the channel-modeling layer(s) 207 may model different types of impairments that occur during over-the-air transmission in a wireless RF system, such as additive Gaussian thermal noise, unknown time and rate of arrival, carrier frequency and phase offset, fading, hardware distortions, interference, and/or delay spread in the received signal.

Such channel-modeling layers 207, such as Gaussian noise and dropout, may be used during training and removed during evaluation or deployment over real channels. In radio communications, additive noise, such as Additive White Gaussian Noise (AWGN) may be modeled by adding a real-valued Gaussian random variable to different signal components, which may be signal basis functions (e.g., in-phase (I) and quadrature (Q) components), that are passed through the channel. In some implementations, a normalization layer may be implemented before the AWGN effects, which normalizes the average power incoming activations, for example to a normalized value equal to 1. This form of constraint can be applied to the encoder 202 to enforce a wide range of possible waveform design criteria, such as a maximum power, minimum power, mean power, mean amplitude, peak to average power ratio, or a wide range of properties of the transmit waveform which may be used as a hard constraint. Alternatively, similar such waveform design objectives may be included as soft constraints which are combined into the network's loss function during training, as further discussed in regards to FIG. 3, below.

Channel-modeling layers 207 may also be implemented to model unknown time and rate of arrival, for example by applying a random or a priori unknown shift and scaling in the time domain, which may model scenarios in which radio propagation times vary and clocks on distributed radio systems are not synchronized. These effects may be modeled, for example, by a random time shift and a random time-dilation rate that have Gaussian distributions.

As other examples of channel-modeling layers 207, carrier frequency and phase offset may be modeled as rotations in signal components, which may be signal basis functions. In some implementations, sampling may be performed using complex baseband representations, in which case unknown offsets in center frequency and absolute phase of arrival due to unsynchronized oscillators on transmitter and receiver, as well as Doppler shift, may result in static or linear polar mixing of the different signal components. To simulate a real system and to improve generalization, such channel-modeling layers 207 may randomly select a phase and a frequency offset, or a linear phase ramp based on an expected center frequency offset error due to independent drifting oscillators.

As yet another example of channel-modeling layers 207, delay spread in the received signal may be modeled to simulate the arrival of numerous delayed and phase shifted copies of a signal arriving at the receiver. Since this is simulated as a linear system and we assume stability over a single sample time window, we can choose a random non-impulsive channel delay spread filter and convolve it with the input signal to obtain an output which has been spread in time linearly according to a random channel response. This assumption may be appropriate, for example, in scenarios where the signal window is smaller than the channel coherence time. In scenarios where the signal window larger than a channel coherence time, the channel progression may be modeled as a sequence with some degree of correlation, and the network 200 may learn techniques correcting the sequence of delay spread modes.

Such delay spread and coherence time may vary in different types of communication systems, including wireline and space-based wireless systems which can sometimes have very short impulsive channel responses, or high frequency and dense multi-path wireless systems which can have long delay spreads. In some implementations, the delay spread is modeled as a channel-modeling layer 207 that implements one or more convolutions or filtering operations on the transmitted RF signal.

In some implementations, the network structure 200 may be utilized with one or more fixed transmission and/or receiving techniques, and may adapt the layers of the encoding network 202 and/or the decoding network 204 to learn encoding and decoding operations that are suitable for those fixed transmission/reception components. For example, in some scenarios the network structure 200 may employ fixed filtering, sampling, modulation, equalization, subcarrier assignment, reference signal insertion, encoding, or other transmission/reception techniques, and may learn suitable network layer parameters or network structures that adapt the overall communication system to best utilize those fixed components.

A general design objective for the network structure 200 may be to obtain a desired reconstruction performance for the reconstructed information 210, subject to other objectives or constraints. For example, certain realizations of the system may favor reduced power and/or bandwidth, other improved properties of the RF signals transmitted over the channel, or improved computational complexity. As such, the system may evaluate a trade-off between these objectives, which may be used in order to help determine the specific architecture used for encoding, decoding, or other signal inference tasks.

Figure 3:
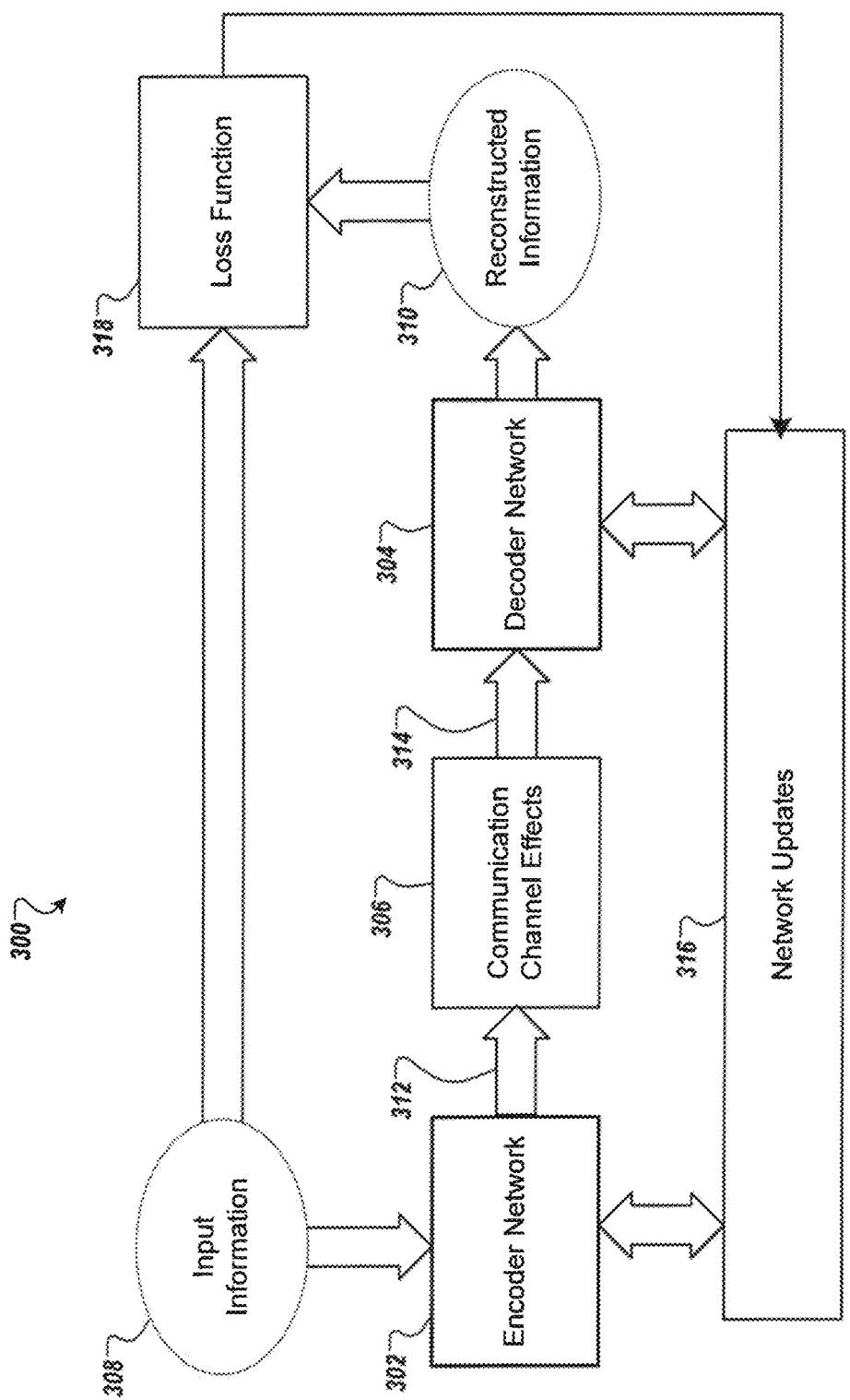
FIG. 3 illustrates an example of a training an RF system that implements machine-learning encoder and decoder networks to learn encoding and decoding over RF channels.

FIG. 3 illustrates an example of a training an RF system 300 that implements machine-learning encoder and decoder networks to communicate over RF channels. The system 300 includes an encoder network 302 and a decoder network 304 that are trained to communicate over the channel 306. The training illustrated in FIG. 3 may be implemented prior to deployment, or in some scenarios may be incorporated as part of deployment, for example to further update and refine the encoder network 302 and decoder network 304 based on real-world performance.

In some implementations, the encoder network 302 and decoder network 304 may be utilized for training to learn suitable encoding and decoding mappings, and such mappings may be implemented in a deployed system using more simplified encoders and decoders. For example, a deployed system may utilize using lookup tables at the encoder and distance-based metrics at the decoder, or other simplified forms of encoding and decoding, that are designed based on results of training the encoder network 302 and decoder network 304. Further discussion of such simplified deployment scenarios is provided in regards to FIG. 7, below.

The channel 306 that is implemented during training may be a model of an RF channel that is obtained via simulation and/or based on real-world RF channel data. For example, in some implementations, training may begin with a simulated channel model and train the encoder network 302 and decoder network 304 based on simulated propagation models reflecting a real world propagation environment or emitter data. The encoder network 302 and decoder network 304 may then be further trained against a real channel where hardware is used with a training feedback loop.

In some implementations, the model of the channel 306 may include effects of transmitter and receiver components, such as filtering, modulation, etc. For example, in scenarios where a simulated channel is used for training, an analytic channel impairment model may be utilized that fits a specific set of hardware/software and wireless deployment conditions. As such, the training in FIG. 3 may train the encoder network 302 and decoder network 304 to operate under different channel conditions, as well as for different real-world transmitter and receiver scenarios.

During training, the encoder network 302 and decoder network 304 may either be jointly trained or iteratively trained. For example, the encoder network 302 and the decoder network 304 may be jointly trained as an auto-encoder (as described in regards to FIG. 2, above). In some implementations, the encoder network 302 and decoder network 304 may be separately trained. In such scenarios, one of the networks may be fixed, either by previous training or by a transmission/reception scheme, while the other network is trained to learn an encoding/decoding strategy that is appropriate for the fixed counterpart network.

For example, the encoder network 302 may be fixed to generate a particular mapping of input information 308 to transmitted RF signals 312, and the decoder network 304 may be trained to learn a mapping from the received RF signal 314 to reconstructed information 310 that is best suited for the fixed encoder 302. In some implementations, the input information 308 may be represented by training data that is utilized for training purposes. The training data may have a different form than the input information 308, but nonetheless may represent the input information 308 for purposes of training. In such scenarios, the encoder network 302 may processes the training data that represents the first information, and the decoder network 304 may generate reconstructed information 310 as a reconstruction of the first information 308 represented by the training data.

The system 300 may compute a loss function 318 between the original input information 308 and the reconstructed information 310. The loss function 318 may be any suitable measure of distance between the input information 308 and reconstructed information 310, such as cross-entropy, mean squared error, or other geometric distance metric (e.g., MAE). In some implementations, the loss function 318 may combine several geometric, entropy based, and/or other classes of distance metrics into an aggregate expression for distance or loss.

In some implementations, additional loss terms may be used in the loss function 318 in combination with such primary loss terms, for example to accomplish secondary objectives (e.g., to reduce interference imposed upon a secondary receiver, or to improve favorable signal properties such as peak to average power ratio (PAPR)).

In addition to achieving an objective that includes the loss function 318, the system 300 may also be configured to achieve an objective related to other performance measures, such as power, bandwidth, complexity, or other performance metrics that are relevant for communication. In some implementations, the system 300 may be configured to achieve a desired trade-off between different performance metrics. For example, achieving such a trade-off may be implemented using an objective function that combines different metrics, for example as a weighted combination of the metrics. In addition or as an alternative, this trade-off may be achieved by selecting a model according to user preferences or application specifications. In addition or as an alternative, the system 300 may implement one or more hard constraints on performance metrics, such as constraints on power, bandwidth, reconstruction error, etc.

In some implementations, a network update process 316 may update the encoder network 302 and/or decoder network 304 based on the various performance metrics. This updating may include updates to the network architectures, parameters, or weights of the networks in the encoder network 302 and/or decoder network 304. For example, the updating may include updating weights or parameters in one or more layers of the networks, selecting machine-learning models for the encoder network 302 and decoder network 304, or selecting a specific network architecture, such as choice of layers, layer-hyperparameters, or other network features. As discussed, updating may be implemented on the encoder network 302 and decoder network 304 in a joint or iterative manner, or individually (as in the case where one of the networks is fixed).

As discussed above, the updates performed by network update process 316 may be performed during training to learn suitable encoding and decoding techniques prior to deployment, and/or may be performed during deployment (if a deployed encoder and/or decoder implement machine-learning networks) to further update the encoder network 302 and/or decoder network 304 based on real-world deployment performance results.

In some implementations, the network update process 316 may update the encoder network 302 and/or decoder network 304 to achieve a desired objective function, which may include the loss function 318 and other performance metrics discussed above. In some implementations, the network update process 316 may utilize an optimization method such as one of evolution, gradient descent, stochastic gradient descent, or other solution technique.

As an example of gradient-based updates, the network update process 316 may calculate a rate of change of the objective function relative to variations in the encoder network 302 and/or decoder network 304, for example by calculating or approximating a gradient of the objective function. Such variations may include, for example, variations in the weights of one or more network layers, as shown in the example of FIG. 3, or other network architecture choices. In scenarios where the channel 306 is based on real RF channel data and does not have a closed form gradient solution, an approximate method may be used to estimate the gradient of the objective function.

Based on the calculated rate of change of the objective function, the network update process 316 may determine a first variation for the encoder network 302 and/or a second variation for the decoder network 304. These variations may be computed, for example, using Stochastic Gradient Descent (SGD) style optimizers, such as Adam, AdaGrad, Nesterov SGD, or others. In some implementations, these variations may be computed using other scalable methods for direct search, such as evolutionary algorithms or particle swarm optimizations.

Once the variations have been determined, the network update process 316 then applies those variations to the encoder network 302 and/or the decoder network 304. For example, the network update process 316 may update at least one encoding network weight in one or more layers of the encoder network 302, and/or at least one decoding network weight in one or more layers of the decoder network 304.

In general, updating the encoder network 302 and decoder network 304 is not limited to updating network weights, and other types of updates may be implemented. For example, updating the encoder network 302 and the decoder network 304 may include selecting a machine-learning model for the encoder network 302, from among a plurality of encoding models, and selecting a machine-learning model for the decoder network 304, from among a plurality of decoding models. In such implementations, selecting machine-learning models may include selecting a specific network architecture, such as choice of layers, layer-hyperparameters, or other network features.

The encoder network 302 and/or decoder network 304 may be trained over various training models of the channel 306, which may be of the same type or of different types of channel models. Depending on the composition of the set of models for channel 306, the encoder network 302 and decoder network 304 may be optimized to communicate over a certain type of RF channel or a wide range of different types of RF channels.

In some implementations, the model of channel 306 may be categorized into a number of different modes. During training, the encoder network 302 and/or decoder network 304 may be trained on the different modes of the channel 306. For each of these modes, the encoder network 302 and/or decoder network 304 may learn suitable encoding and/or decoding techniques for the different modes. The different modes of the channel 306 may represent any suitable categorization of channel condition, such as level of noise, SNR, delay spread, rate of channel variations, bandwidth, etc.

In some implementations, instead of the channel 306 being a simulated channel, a real channel may be used to train the encoder network 302 and/or decoder network 304. In such implementations, additional transmission and reception components (either hardware or software) may be implemented to transmit and receive analog RF waveforms over the real channel. Such transmit and receive components may be implemented either in the encoder network 302 and decoder network 304, or their effects may be included in the channel effects that are accounted for in the model of the channel 306. As such, the training in FIG. 3 may be performed over any suitable channel 306, whether simulated or real, to train the encoder network 302 and decoder network 304 to learn suitable encoding and decoding techniques.

During training, the encoder network 302 may be configured to learn a mapping from input information 308 into a transmitted RF signal 312. Analogously, the decoder network 304 may be configured to learn a reverse mapping from a received RF signal 314 into reconstructed information 310. As discussed above, the transmitted RF signal 312 and received RF signal 314 may represent analog RF waveforms that are transmitted and received over an RF channel, or may represent intermediate representations (e.g., samples of RF waveforms, coefficients of basis functions, distributions over RF waveforms, etc.) that are transformed to and from analog RF waveforms through processing by one or more other components, such as filters, modulators, equalizers, etc. For example, in the scenario where the encoder network 302 and decoder network 304 are implemented as a variational auto-encoder (as discussed in regards to FIG. 2, above), the RF signals 212 and 214 may represent distributions over RF waveform values. In general, the transmitted RF signal 312 and received RF signal 314 may represent any suitable RF signal representations that are learned by the encoder network 302 and decoder network 304 for encoding and decoding information over a particular channel or class of channels.

In some implementations, the encoding and decoding mappings may involve a set of basis functions. The basis functions may be used by the encoder network 302 to transform the input information 308 into the transmitted RF signal, which may be a set of basis coefficients, or an RF waveform that is a weighted combination of basis functions, or other suitable representation using a particular set of basis functions. Analogously, the decoder network 304 may use the same set of basis functions to process the received RF signal 314 to generate the reconstructed information 310, for example by taking projections of the RF signal 314 onto the set of basis functions to generate basis coefficients, or in the scenario where the RF signal 314 is itself a set of basis coefficients, by transforming the basis coefficients in the RF signal 314 into the reconstructed information 310.

The basis functions may be any suitable orthogonal set or non-orthogonal set of basis functions. For example, the basis functions may be In-Phase and Quadrature-Phase (I/Q) signals, Fourier basis functions, polynomial basis functions, Gaussian basis functions, exponential basis functions, wavelet basis functions, or combinations of these and/or other suitable set of basis functions that can be utilized to represent RF waveforms that are transmitted over a channel. The basis functions may have different phase, amplitude, and/or frequency components. In some implementations, the basis functions may be parameterized and the training may involve optimizing over parameters of the basis functions.

Training the encoder network 302 and decoder network 304 may begin with any suitable set of initial conditions. For example, the training may begin with a random set of basis functions subject to certain conditions. Alternatively, the training may begin with a fixed set of basis functions, such as commonly used RF communication basis functions including Quadrature Phase-Shift Keying (QPSK) or Gaussian Binary Frequency Shift Keying (GFSK), orthogonal frequency division multiple access (OFDM), or other fixed set of basis functions.

During training, the encoder network 302 and decoder network 304 attempt to learn improved basis functions, according to results of encoding and decoding. Training the encoder 102 and decoder 104 may involve optimizing over a set of basis functions or over different sets of basis functions, for example using greedy search or other optimization-type algorithm.

In some implementations, the input information 308 may be chosen from a training set of information. The input information 308 may, in some implementations, be limited to a particular class of information, such as binary information, discrete-time information, analog waveforms, or other class of information. In such scenarios, the system 300 will be trained to learn communication encoding and decoding techniques that are tuned to communicate that particular class of information (over a particular channel or class of channels). By training on different types of information 308 and different types of channels 306, the system 300 may be trained to learn different encoding and decoding operations that are applicable to different communication scenarios.

The loss function 318 may be any suitable measure, or combination of measures, of distance between the input information 308 and the reconstructed information 310. For example, the loss function 318 may include cross-entropy, mean squared error (MSE), clipped MSE which penalizes predicted values according to MSE but only for values which fall on the wrong side of a decision threshold, or an exponential loss function that penalizes loss exponentially, or other suitable distance metric(s).

In addition, as discussed above, other performance metrics may be incorporated into training, for example as part of the loss function 318 and/or as hard constraints, etc. For example, such performance metrics may include bit error rate (BER) as a function of the signal-to-noise ratio (SNR), communication bandwidth, communication power, spectral efficiency (the number of bits per second that can be transmitted over a fixed bandwidth channel at a specific SNR). Any one or combinations of such metrics may be utilized during training as part of the loss function 318 (e.g., as a weighted combination) and/or as hard constraints in addition to the loss function 318.

Figure 4:
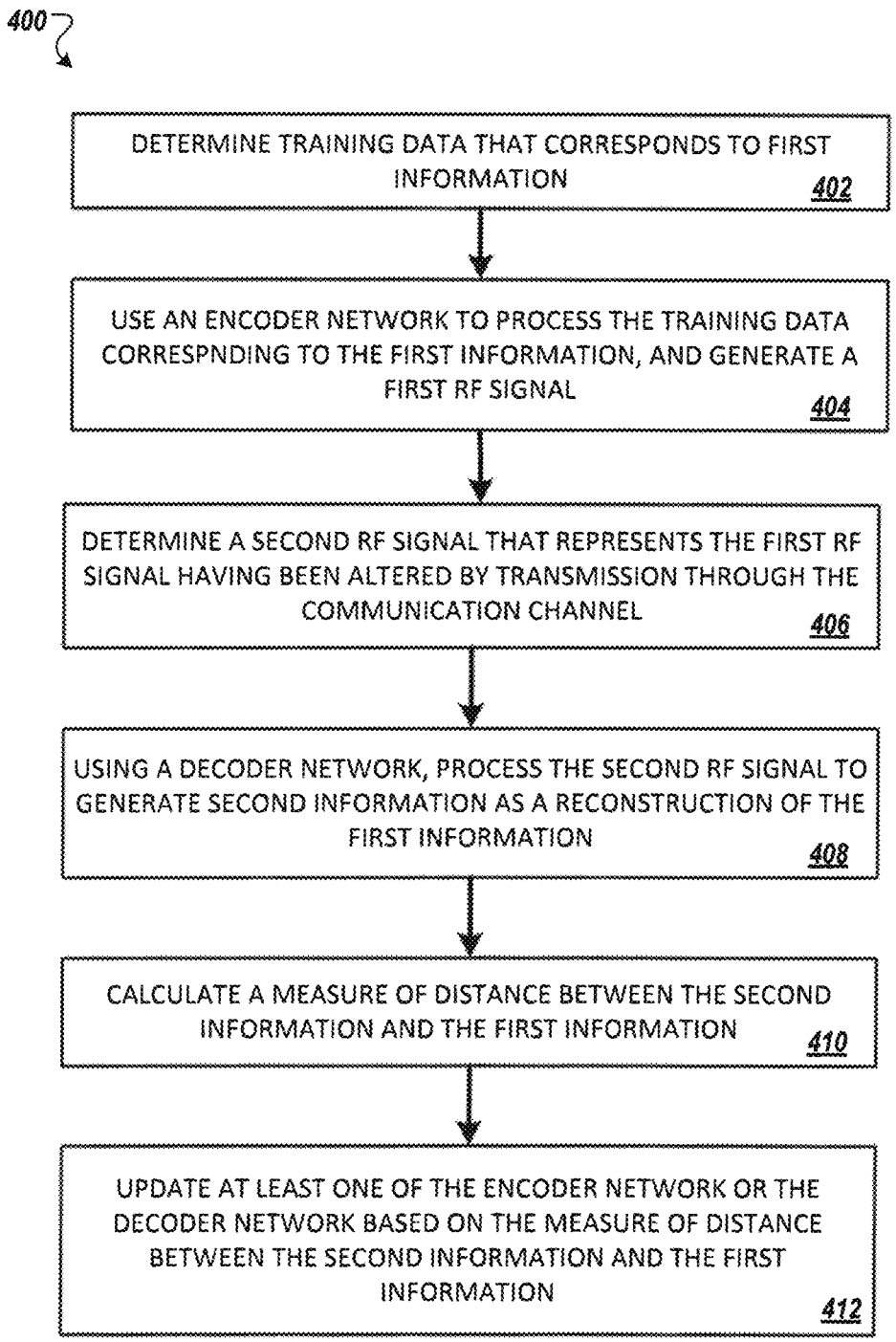
FIG. 4 is a flowchart illustrating an example method of training an RF system that implements machine-learning encoder and decoder networks to learn encoding and decoding over RF channels.

FIG. 4 is a flowchart illustrating an example method 400 of training an RF system that implements machine-learning encoder and decoder networks to learn encoding and decoding over RF channels. The training method 400 may be performed by one or more processors, such as one or more CPUs, GPUs, DSPs, FPGAs, ASICs, TPUs, or neuromorphic chips or vector accelerators that execute instructions encoded on a computer storage medium.

The training method 400 includes determining first information (402), which may be information that is to be communicated over an RF channel. As discussed above, the first information may be any suitable discrete-time, analog, discrete-valued, or continuous-valued information. For example, in some instances, this input information may be whitened discrete bits or symbols, or in other cases, the input information may follow the distribution of a non-whitened information source. As previously discussed in regards to FIG. 3, above, in some implementations, the first information may be represented by training data that is utilized for training purposes. In such scenarios, the training data may have a different form than the first information, but nonetheless may represent the first information for purposes of training.

An encoder machine-learning network is used to process this first information to generate a first RF signal that is to be transmitted over a communication channel (404). As discussed above, in some implementations the first information may be represented by training data, in which case the encoder machine-learning network processes the training data representing the first information. Furthermore, as discussed above, the generated first RF signal may represent an analog RF waveform that is transmitted over a channel, or may be an intermediate representation (e.g., samples, basis coefficients, distributions over RF waveforms, etc.) that undergoes further processing (e.g., filtering, D/A conversion, modulation, etc.) to generate an analog RF waveform. This encoding process may utilize any suitable mapping from an input information space into an RF signal space, as discussed in regards to FIG. 3, above.

The training method 400 further includes determining a second RF signal that represents the first RF signal having been altered by transmission through the communication channel (406). In training scenarios, the effects of the communication channel may be implemented by a model of a channel obtained by simulation and/or real channel data, or may be implemented by a real-world communication channel. As discussed above, the second RF signal may represent an analog RF waveform that is received over a channel, or may be an intermediate representation (e.g., samples, basis coefficients, distributions over RF waveforms etc.) that is a result of processing (e.g., filtering, sampling, equalizing, etc.) a received analog RF waveform.

A decoder machine-learning network is then used to process the received RF signal and generate second information as a reconstruction of the first information (408). As previously discussed in regards to FIG. 3 and in regards to steps 402 and 404, above, in some implementations, the first information may have been represented by training data that is utilized for training purposes. In such scenarios, the input training data may have a different form than the original first information, but nonetheless the decoder may generate the second information as a reconstruction of the first information that is represented by the training data. This decoding process may utilize any suitable mapping from an RF signal space into reconstructed information space, as discussed in regards to FIG. 3, above.

A measure of distance is calculated between the second information and the first information (410). This measure of distance may be implemented as a loss function (e.g., loss function 318 in FIG. 3) and may represent a difference or error between the original input information and the second (reconstructed) information. As examples, the measure of distance may include cross-entropy, mean squared error, or other geometric distance metric (e.g., MSE, MAE, KL divergence), or may combine several geometric and/or entropy-based distance metrics into an aggregate expression for distance.

The training method 400 further includes updating at least one of the encoder network or the decoder network based on the measure of distance between the second information and the first information (412). This update may be applied to the encoder network and/or the decoder network in a joint or iterative manner, or individually, as discussed above. The updates may generally include updating any suitable machine-learning network feature of the encoder network and/or decoder network, such as network weights, architecture choice, machine-learning model, or other parameter or connectivity design, as discussed in regards to FIG. 3, above. As an example, in some implementations, if the encoder network and/or decoder network are trained to learn a set of basis functions for communicating over the RF channel, then the update process may include updating the set of basis functions that are utilized in the encoder network and/or decoder network.

Figure 5:
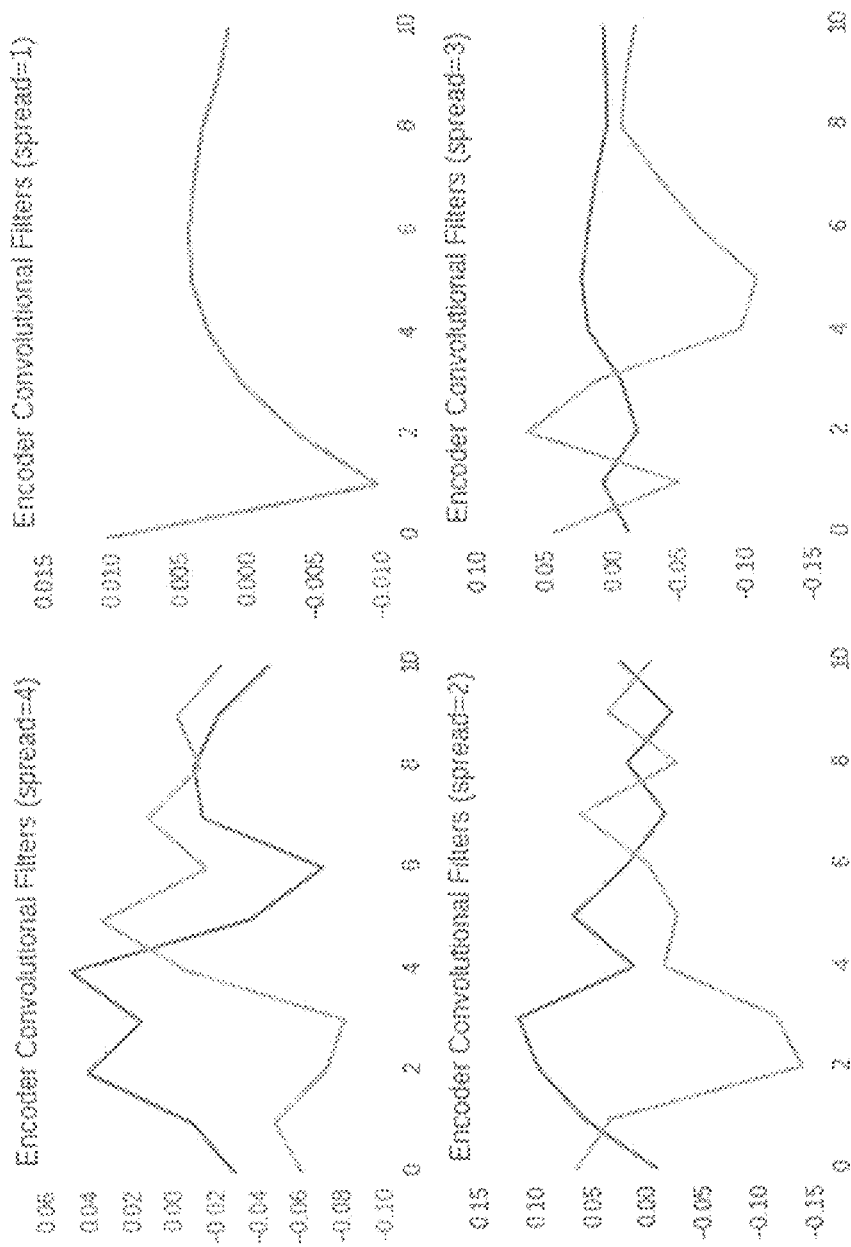
FIG. 5 illustrates examples of basis functions that may be learned and utilized by an encoder machine-learning network and/or decoder machine-learning network to communicate over RF channels.

FIG. 5 illustrates examples of basis functions that may be learned and utilized by an encoder machine-learning network and/or decoder machine-learning network to communicate over RF channels. The examples in FIG. 5 illustrate four different sets of convolutional basis functions that are learned by an encoder for four different values of delay spread in a communication channel. However, in general any suitable form of basis functions may be learned by the encoder network and/or decoder network.

As shown in FIG. 5, different types of basis functions are learned for different values of delay spread (delay spread values 4, 3, 2, and 1). In these examples, each set of basis functions has two components, although in general any suitable number of basis functions may be learned. In these examples, the encoder has learned to adjust the compactness of the two basis components depending on the delay spread in the channel.

Therefore, based on such training, the encoder and/or decoder may be deployed to utilize different sets of basis functions for different channel conditions (e.g., different channel delay spreads) in an adaptive manner. For example, in scenarios where machine-learning networks are deployed in a real-world communication system, the system may obtain channel state information (CSI) and adjust the encoder network and/or decoder network according to the state of the channel. Depending on the state of the channel, the encoder network and/or decoder network may simply adjust parameters (e.g., transmission power) for the same set of basis functions, or may change the set of basis functions entirely (e.g., by switching between the four sets of basis functions in FIG. 5). Such updates may also be performed during deployment based on simplified encoders and/or decoders that do not utilize full machine-learning networks, but instead utilize simplified encoding and/or decoding techniques based on results of training a corresponding encoder machine-learning network and decoder machine-learning network.

Figure 6:
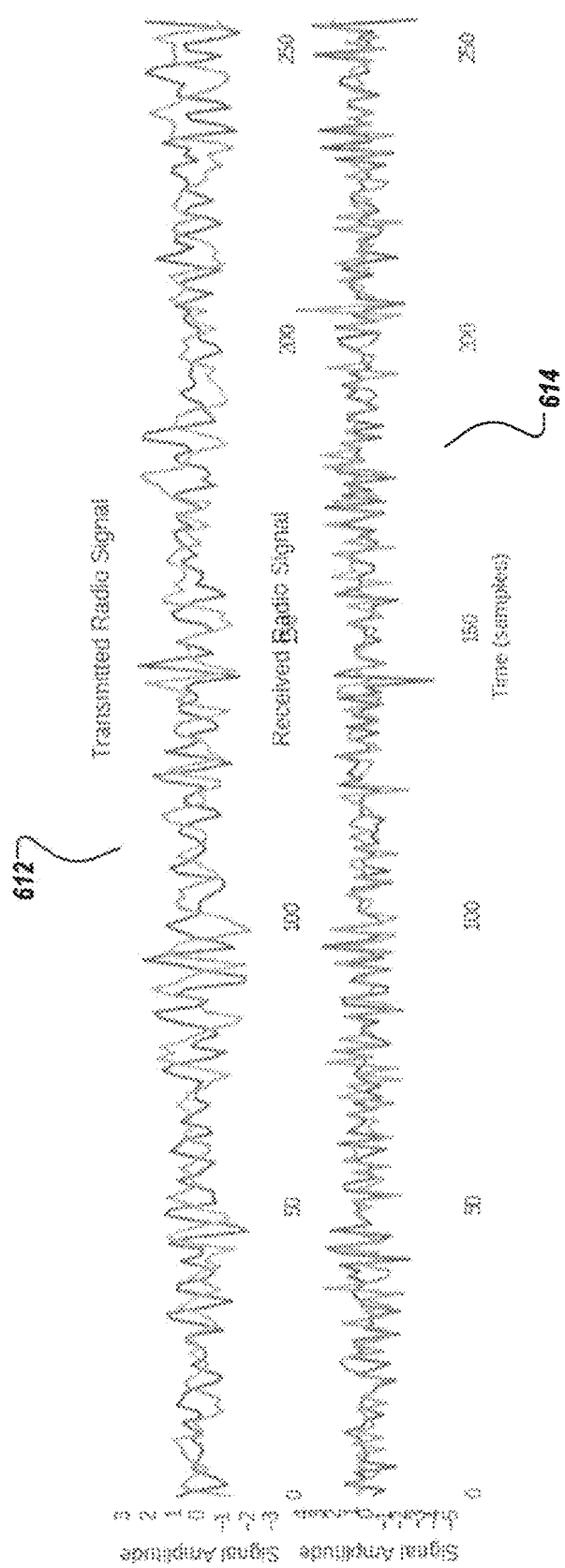
FIG. 6 illustrates examples of a transmitted RF signal and a received RF signal that may be learned by an encoder machine-learning network and a decoder machine-learning network for communicating over an RF channel.

FIG. 6 illustrates examples of a transmitted RF signal 612 and a received RF signal 614 that may be learned by the encoder and decoder machine-learning networks for communicating over an RF channel. The signals may correspond to the previously discussed transmitted RF signal 312 and received RF signal 314 in FIG. 3, above.

In the examples of FIG. 6, the transmitted RF signal 612 and received RF signal 614 represent analog RF waveforms that are actually transmitted and received over a channel. For example, the transmitted RF signal 312 may be a waveform that is actually transmitted over a communication medium, and the received RF signal 314 may be a waveform that is actually received after having undergone impairments over a communication medium. However, as discussed in regards to FIGS. 1 and 3, above, in general the transmitted RF signals and received RF signals that are learned by the encoder and decoder may be any suitable representation (e.g., samples, basis coefficients, etc.) that may be further processed or transformed into analog RF waveforms.

In the examples of FIG. 6, the RF signals are at 0 dB SNR for 128 bits of information, and In-phase and Quadrature-phase components are shown for the transmitted and received RF signals. In general, however, the encoder and decoder machine-learning networks may be trained to learn any suitable form of transmitted and received RF signals, and are not limited in the number of components in each RF signal.

As shown in FIG. 6, the transmitted RF signal 612 is not immediately recognizable as corresponding to any known modulation scheme that is currently used in systems today. For example, the transmitted RF signal 612 appears to use at least three common discrete levels, and appears to encode information in some mixture of time and frequency across the sample space.

Figure 7:
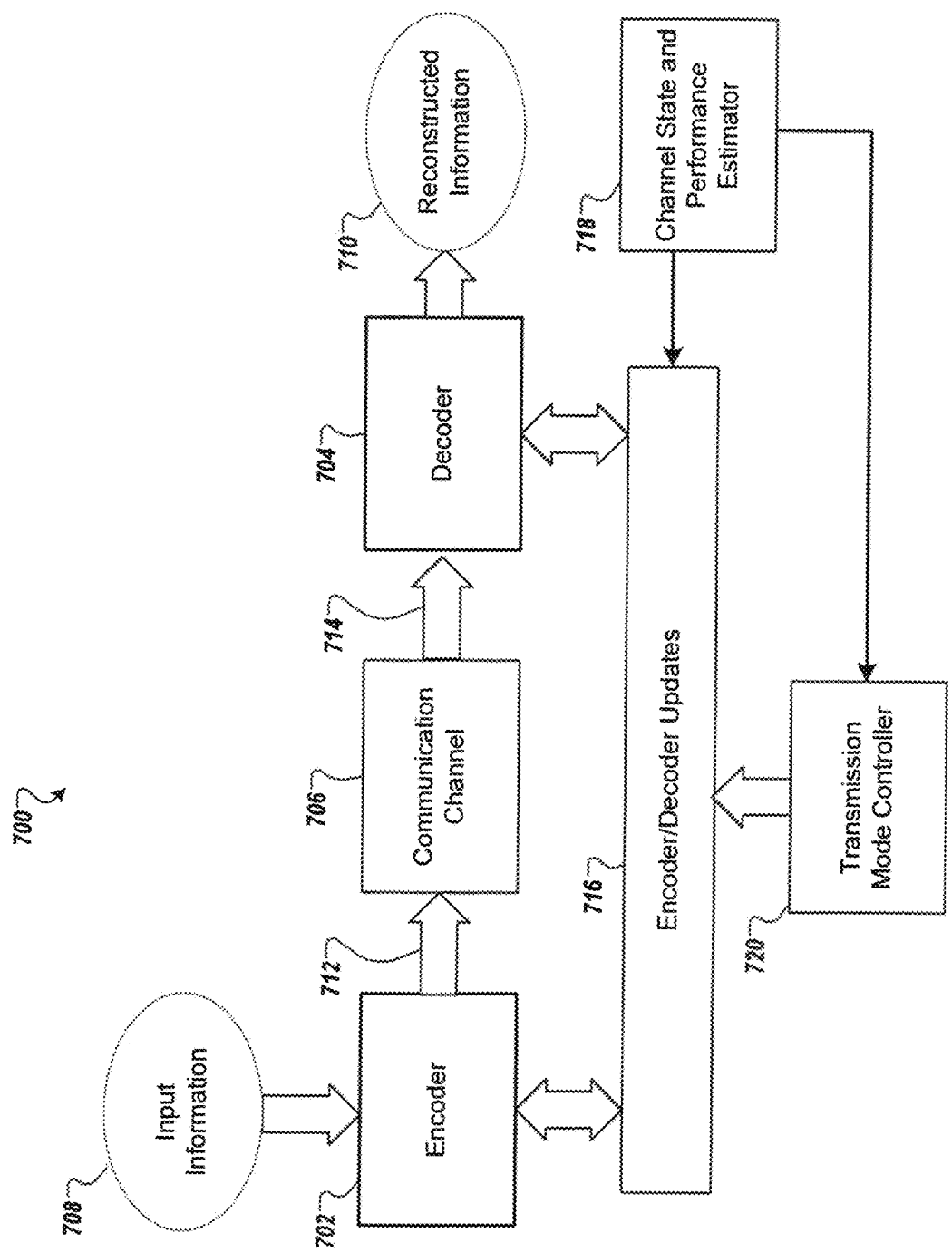
FIG. 7 illustrates an example of deploying a system that implements an encoder and decoder that utilize encoding and/or decoding techniques based on results of training encoding and decoding machine-learning networks to perform learned communication over a real-world RF channel.

FIG. 7 illustrates an example of a system 700 with an encoder and decoder that may be deployed for learned communication of information over a real-world communication channel. The system 700 includes an encoder 702 and decoder 704 that are deployed to communicate over a real-world channel 706.

The encoder 702 receives input information 708 to be communicated, and maps the input information 708 into a transmitted RF signal 712. The encoding mapping that is utilized by the encoder 702 may be designed based on previous training of a machine-learning network that learned how to encode information into RF signals, using the training described in regards to FIGS. 3 and 4, above. For example, the encoder 702 may implement a trained machine-learning network during deployment, or may implement a simplified encoding mapping that utilizes results of training a machine-learning network, as discussed further below.

As previously discussed, in some implementations, the encoder 702 may include processing (e.g., filtering, modulation, etc.) that generates the RF signal 712 as an analog RF waveform for transmission. Alternatively, in other implementations, the encoder 702 may generate the RF signal 712 as an intermediate representation that is subsequently processed into an analog RF waveform by additional processing such as filtering or modulation for transmission over the channel 706.

The decoder 704 receives RF signal 714 that has been impaired by the channel 706, and maps the received RF signal 714 into reconstructed information 710. The decoding mapping that is utilized by decoder 704 may be designed based on previous training of a machine-learning network that learned how to decode RF signals into reconstructed information, using the training described in regards to FIGS. 3 and 4, above. For example, the decoder 704 may implement a trained machine-learning network during deployment, or may implement a simplified decoding mapping that utilizes results of training a machine-learning network, as discussed further below As previously discussed, in some implementations, the decoder 704 may include processing (e.g., filtering, modulation, etc.) that directly inputs the received RF signal 714 as an analog RF waveform received over the channel. Alternatively, in other implementations, the decoder 704 may process the RF signal as an intermediate representation that results from prior processing of an analog RF waveform that was received from the channel 706.

In some implementations, the encoder 702 and/or decoder 704 may be updated during deployment, for example by update process 716, based on results of communication. Such updates may be based on feedback information that is determined based on results of transmission and reconstructions during deployment.

In some implementations, the system 700 may be configured to collect information regarding the channel 706 and/or regarding performance metrics, for example using channel state and performance estimator 718. The estimator 718 may be configured to detect such information, for example, by detecting a training signal that was transmitted as the transmitted RF signal 712. The estimator 718 may provide such information via feedback to control various updates to the encoder 702 and/or decoder 704 during deployment, as shown in the example of FIG. 7. Such updates may include updating one or more machine-learning features (in scenarios where the encoder 702 and/or decoder 704 implement machine-learning networks during deployment), or may include updating a simplified encoding and/or decoding mapping that is utilized by the encoder 702 and/or decoder 704 (in scenarios where the encoder 702 and/or decoder 704 implement simplified encoding/decoding techniques based on previously-trained machine-learning networks).

The feedback that is sent from the channel state and performance estimator 718 may take any suitable form and may be transmitted on any suitable time scale. For example, such feedback may be provided based on estimates obtained from the forward link (encoder 702 to decoder 704) or based on estimates obtained from a reverse link (decoder 704 to encoder 702) to estimate the state of the channel and/or estimates of performance. The feedback information may vary in size depending on various factors, such as the number of modes to choose from, the available bandwidth and latency of the feedback channel, and other considerations. In some instances, this feedback information may be encoded into protocol messages within a wireless system.

As an example, the feedback may be generated by the encoder 702 transmitting a known training RF signal, and the decoder 704 (and/or other component in the RF receiver) determining the state of the channel and performance measurements based on comparing the received RF signal with the known transmitted training RF signal. In some implementations, the feedback may only be provided to the receiver to update the decoder 704, without necessarily providing the feedback to the transmitter to update the encoder 702 (half-model updates).

The conditions of channel 706 may change over different time scales, for example depending on the type of environment in which the RF signals are communicated. For instance, the time scale of variations in the channel 706 may depend on whether the environment is rural or urban, whether environmental objects are moving quickly or slowly (e.g., specifying coherence time, or correlation time of channel statistics), whether the environment is in an aircraft or spacecraft, or whether other radio emitters are located nearby. In some instances where the channel coherence time is very long or static (e.g., fixed radios and reflectors), encodings may be specifically learned for these impairments over long time scale. One example of this might be in a fixed geometry industrial or urban communications environment.

In some implementations, the conditions present in the channel 706 may be categorized into a number of different modes. The different modes may represent any suitable categorization of channel conditions, such as level of noise, SNR, delay spread, time scale of channel variations, etc. For each of these modes, the encoder 702 and/or decoder 704 may have been trained to learn a suitable set of encoding and/or decoding techniques, as discussed in regards to FIG. 3, above. During deployment, the encoder 702 and/or decoder 704 may be adaptively updated based on the particular mode of the channel 706 that is estimated. As shown in FIG. 7, in some implementations, a transmission mode controller 720 may be implemented to decide which mode configuration is to be utilized for the encoder 702 and/or decoder 704.

The transmission mode controller 720 may utilize feedback from the channel state and performance estimator 718. As discussed above, such feedback may be obtained from the forward and/or reverse link, and may be provided to the transmission mode controller 720 to help decide which mode of operation to select at any given time. In this way, the system 700 can learn suitable encoding and/or decoding techniques for a range of different channel conditions and then adaptively update the encoder 702 and/or decoder 704 to select a suitable mode under any given channel condition.

There are a number of scenarios in which learned communications may be used in real world applications. For example, during training, the encoder 702 and/or decoder 704 may be trained on closed-form analytic models of channel 706. Given sufficiently accurate stable analytic models of the channel of interest, efficient representations for communication across the channel 706 may be learned and used without any on-line adaptation. Such implementations may be suitable in environments where the real-world channel 706 sufficiently corresponds to analytic models, such as channels that vary slowly in time, or are otherwise more stable and predictable.

As another example, in scenarios where channels vary more unpredictably in the real world, such as depending on deployment location, conditions, or nearby effects, the system 700 may perform on-line adaptation and on-line learning of specialized encoding and/or decoding techniques that perform well for the given real world deployment scenario. In such implementations, updates to the encoder 702 and/or decoder 704 may be performed during deployment, based on real-world measurements of the channel and/or system performance. Such updates may be performed based on results of objective-achieving strategies that were learned in regards to training in FIGS. 3 and 4, above.

However, if the real-world feedback does not lend itself to exact analytic expression for the channel transform, then the update process 716 may utilize approximations, rather than exact analytic solutions, to determine updates for the encoder 702 and/or decoder 704. For example, in implementations where gradients of an objective function are computed, then approximate gradients may be computed, rather than exact derivative calculations. Furthermore, in real-world scenarios, the update process 716 may additionally consider real-world factors, such as communications cost, latency, and capacity of the feedback channel from the channel state and performance estimator 718. In general, more accurate and more extensive feedback allows for updates that are more effective by the update process 716, but at the cost of communications, latency, and bandwidth. Therefore, in deployment scenarios where the encoder 702 and/or decoder 704 are updated based on feedback information, such additional considerations may be factored into the update process 716.

In some implementations, the encoder 702 and/or decoder 704 may utilize simplified forms of encoding and/or decoding mappings that were learned during training. For example, the encoder 702 may utilize a simplified lookup table to generate the transmitted RF signal 712 based on the input information 708. Analogously, in some implementations, the decoder 704 may generate the reconstructed information 710 from the received RF signal 714 by utilizing a distance-based decoding technique, or other simplified decoding technique that is based on a more general decoding mapping learned during training, or that is based on an encoder mapping that was learned during training.

As a specific example of such simplified deployment, in some implementations, during training, an encoder machine-learning network may learn a mapping from input information 708 to RF signals 712. The mapping may be, for example, a signal constellation that represents different RF signals 712 as different points in the constellation corresponding to particular inputs 708. However, during deployment, the encoder 702 may utilize a simplified lookup-table (LUT) to map input information 708 to points on the constellation to generate the RF signal 712, based on the training results of the encoder machine-learning network. Analogously, the decoder 704 may utilize simplified decoding algorithms (e.g., distance-based decoding algorithms) that are based on results of training a decoder machine-learning network, or based on a counterpart trained encoder machine-learning network.

In such scenarios, the encoder 702 and/or decoder 704 may be trained (e.g., as an autoencoder) for system design during training, but approximations or compact look up tables may be utilized, in the encoder 702 and/or the decoder 704, to deploy and implement the system 700 in real-world applications. As such, in some implementations, the encoder 702 and decoder 704 that are implemented in a deployed system may not implement a full machine-learning network, but instead may utilize results of encoding and decoding mappings that were learned by machine-learning networks during training. In some cases, these learned mappings from a neural network may already form very compact and efficient tensor computation expressions which can be deployed efficiently into a baseband processor.

Figure 8:
FIG. 8 is a flowchart illustrating an example method of deploying an encoder and decoder that utilize encoding and/or decoding techniques based on results of training encoding and decoding machine-learning networks to perform learned communication over a real-world RF channel.

FIG. 8 is a flowchart illustrating an example method 800 of deploying an encoder and decoder to perform learned communication over a real-world RF channel. Such deployment may utilize encoding and decoding techniques that were previously learned by machine-networks during trained, for example by using training techniques discussed in regards to FIGS. 3 and 4, above, or similar training techniques.

The method 800 includes determining an encoder and a decoder, at least one of which implements an encoding or decoding that is based on at least one of an encoder machine-learning network or a decoder machine-learning network that has been trained to encode or decode information over a communication channel (802). In some scenarios, the deployed encoder and/or decoder may implement machine-learning networks that were previously trained. Alternatively, in other scenarios, the encoder and/or decoder may utilize simplified encoding/decoding mappings that are based on results of previously training an encoder machine-learning network and/or decoder machine-learning network, as discussed in regards to FIG. 7, above.

The method 800 further includes determining first information (804). As discussed above, the first information may be any suitable discrete-time, analog, discrete-valued, or continuous-valued information.

The encoder is then used to process this first information to generate a first RF signal (806). As discussed above, the first RF signal may represent an analog RF waveform that is transmitted over a channel, or may be an intermediate representation (e.g., samples, basis coefficients, etc.) that undergoes further processing (e.g., filtering, D/A conversion, modulation, etc.) to generate an analog RF waveform. This encoding process may utilize any suitable mapping, or simplified form of a mapping, from an input information space into an RF signal space that was learned during training an encoder machine-learning network, for example using training techniques discussed in regards to FIG. 3, above.

The method 800 further includes transmitting, using at least one transmitter, the first RF signal, through a communication channel (808). As discussed in regards to step 806, above, transmission of the first RF signal may involve directly transmitting the first RF signal itself (e.g., if the encoder has generated the first RF signal as an analog RF waveform suitable for transmission over the channel), or may involve processing the first RF signal to convert it into an analog RF waveform for transmission (e.g., using filtering, D/A conversion, modulation, etc.). The transmission may utilize any suitable transmission technique which may include other features or parameters, for example using single or multiple antennas, adaptive power control, etc.

The method 800 further includes receiving a second RF signal that represents the first RF signal having been altered by transmission through the communication channel (810). In deployment scenarios, the communication is in a real-world channel (in contrast to training scenarios of FIGS. 3 and 4, where the channel may be a simulated channel or real-world channel). As discussed above, the second RF signal may represent an analog RF waveform that is received over a channel, or may be an intermediate representation (e.g., samples, basis coefficients, etc.) that is a result of processing (e.g., filtering, sampling, equalizing, etc.) a received analog RF waveform.

A decoder is then used to process the received second RF signal and generate second information as a reconstruction of the first information (812). This decoding process may utilize any suitable mapping, or simplified form of a mapping, from an RF signal space into reconstructed information space that was learned by a decoder machine-learning network during training, for example using training techniques discussed in regards to FIG. 3, above.

As discussed in regards to FIG. 7, above, in some implementations, a deployed system may further utilize the received second RF signal (and/or other information resulting from the communication) to generate feedback and update the encoder and/or the decoder.

Furthermore as discussed in regards to FIG. 7, above, in some implementations, the encoder and/or decoder may utilize simplified forms of encoding and/or decoding mappings that were learned during training. For example, the encoder may utilize a simplified lookup table to generate the first RF signal based on the first information. Furthermore, in some implementations, the decoder may utilize a distance-based decoding technique, or other simplified decoding technique that is based on a more general decoding mapping that was learned during training, or that is based on the encoder mapping that was learned during training. As such, in some implementations, the encoder and decoder that are implemented in a deployed system may not implement a full machine-learning network, but instead may utilize results of encoding and decoding mappings that were learned by machine-learning networks during training.

Figure 9:
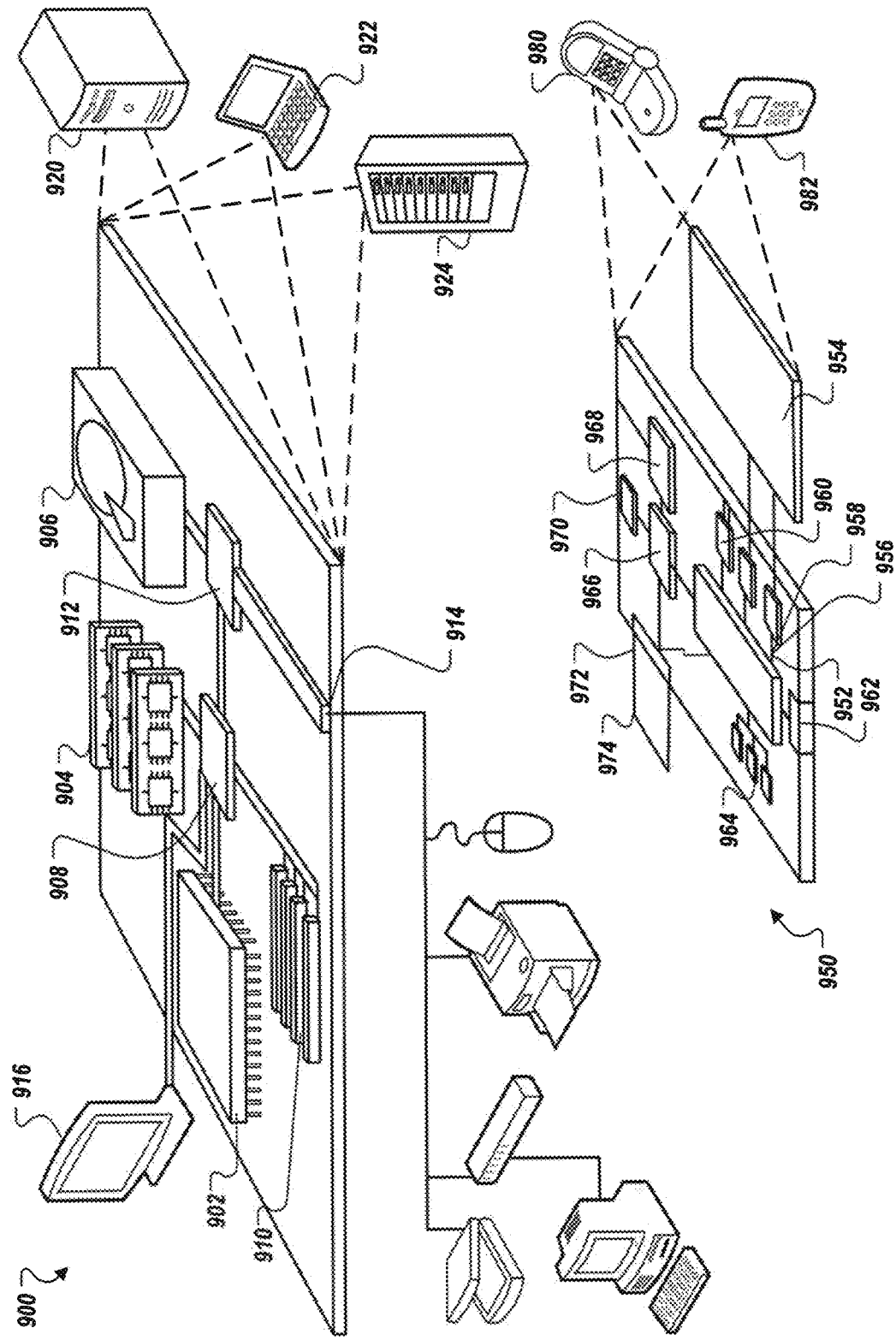
FIG. 9 is a diagram illustrating an example of a computing system that may be used to implement one or more components of a system that performs learned communication over RF channels.

FIG. 9 is a diagram illustrating an example of a computing system that may be used to implement one or more components of a system that performs learned communication over RF channels.

The computing system includes computing device 900 and a mobile computing device 950 that can be used to implement the techniques described herein. For example, one or more parts of an encoder machine-learning network system or a decoder machine-learning network system could be an example of the system 900 described here, such as a computer system implemented in any of the machine-learning networks, devices that access information from the machine-learning networks, or a server that accesses or stores information regarding the encoding and decoding performed by the machine-learning networks.

The computing device 900 is intended to represent various forms of digital computers, such as laptops, desktops, workstations, personal digital assistants, servers, blade servers, mainframes, and other appropriate computers. The mobile computing device 950 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 902 is a single-threaded processor. In some implementations, the processor 902 is a multi-threaded processor. In some implementations, the processor 902 is a quantum computer.

The memory 904 stores information within the computing device 900. In some implementations, the memory 904 is a volatile memory unit or units. In some implementations, the memory 904 is a non-volatile memory unit or units. The memory 904 may also be another form of computer-readable medium, such as a magnetic or optical disk.

The storage device 906 is capable of providing mass storage for the computing device 900. In some implementations, the storage device 906 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 902), perform one or more methods, such as those described above. The instructions can also be stored by one or more storage devices such as computer- or machine-readable mediums (for example, the memory 904, the storage device 906, or memory on the processor 902). The high-speed interface 908 manages bandwidth-intensive operations for the computing device 900, while the low-speed interface 912 manages lower bandwidth-intensive operations. Such allocation of functions is an example only. In some implementations, the high-speed interface 908 is coupled to the memory 904, the display 916 (e.g., through a graphics processor or accelerator), and to the high-speed expansion ports 910, which may accept various expansion cards (not shown). In the implementation, the low-speed interface 912 is coupled to the storage device 906 and the low-speed expansion port 914. The low-speed expansion port 914, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. In addition, it may be implemented in a personal computer such as a laptop computer 922. It may also be implemented as part of a rack server system 924. Alternatively, components from the computing device 900 may be combined with other components in a mobile device (not shown), such as a mobile computing device 950. Each of such devices may include one or more of the computing device 900 and the mobile computing device 950, and an entire system may be made up of multiple computing devices communicating with each other.

The mobile computing device 950 includes a processor 952, a memory 964, an input/output device such as a display 954, a communication interface 966, and a transceiver 968, among other components. The mobile computing device 950 may also be provided with a storage device, such as a micro-drive or other device, to provide additional storage. Each of the processor 952, the memory 964, the display 954, the communication interface 966, and the transceiver 968, are interconnected using various buses, and several of the components may be mounted on a common motherboard or in other manners as appropriate.

The processor 952 can execute instructions within the mobile computing device 950, including instructions stored in the memory 964. The processor 952 may be implemented as a chipset of chips that include separate and multiple analog and digital processors. The processor 952 may provide, for example, for coordination of the other components of the mobile computing device 950, such as control of user interfaces, applications run by the mobile computing device 950, and wireless communication by the mobile computing device 950.

The processor 952 may communicate with a user through a control interface 958 and a display interface 956 coupled to the display 954. The display 954 may be, for example, a TFT (Thin-Film-Transistor Liquid Crystal Display) display or an OLED (Organic Light Emitting Diode) display, or other appropriate display technology. The display interface 956 may include appropriate circuitry for driving the display 954 to present graphical and other information to a user. The control interface 958 may receive commands from a user and convert them for submission to the processor 952. In addition, an external interface 962 may provide communication with the processor 952, so as to enable near area communication of the mobile computing device 950 with other devices. The external interface 962 may provide, for example, for wired communication in some implementations, or for wireless communication in other implementations, and multiple interfaces may also be used.

The memory 964 stores information within the mobile computing device 950. The memory 964 can be implemented as one or more of a computer-readable medium or media, a volatile memory unit or units, or a non-volatile memory unit or units. An expansion memory 974 may also be provided and connected to the mobile computing device 950 through an expansion interface 972, which may include, for example, a SIMM (Single In Line Memory Module) card interface. The expansion memory 974 may provide extra storage space for the mobile computing device 950, or may also store applications or other information for the mobile computing device 950. Specifically, the expansion memory 974 may include instructions to carry out or supplement the processes described above, and may include secure information also. Thus, for example, the expansion memory 974 may be provided as a security module for the mobile computing device 950, and may be programmed with instructions that permit secure use of the mobile computing device 950. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier such that the instructions, when executed by one or more processing devices (for example, processor 952), perform one or more methods, such as those described above. The instructions can also be stored by one or more storage devices, such as one or more computer- or machine-readable mediums (for example, the memory 964, the expansion memory 974, or memory on the processor 952). In some implementations, the instructions can be received in a propagated signal, for example, over the transceiver 968 or the external interface 962.

The mobile computing device 950 may communicate wirelessly through the communication interface 966, which may include digital signal processing circuitry where necessary. The communication interface 966 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 968 using a radio frequency. In addition, short-range communication may occur, such as using a Bluetooth, Wi-Fi, or other such transceiver (not shown). In addition, a GPS (Global Positioning System) receiver module 970 may provide additional navigation- and location-related wireless data to the mobile computing device 950, which may be used as appropriate by applications running on the mobile computing device 950.

The mobile computing device 950 may also communicate audibly using an audio codec 960, which may receive spoken information from a user and convert it to usable digital information. The audio codec 960 may likewise generate audible sound for a user, such as through a speaker, e.g., in a handset of the mobile computing device 950. Such sound may include sound from voice telephone calls, may include recorded sound (e.g., voice messages, music files, etc.) and may also include sound generated by applications operating on the mobile computing device 950.

The mobile computing device 950 may be implemented in a number of different forms, as shown in the figure. For example, it may be implemented as a cellular telephone 980. It may also be implemented as part of a smart-phone 982, personal digital assistant, or other similar mobile device.

The term "system" as used in this disclosure may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general-purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

What is claimed is:

1. A method of transmitting and receiving information through a communication channel, the method comprising:
    determining an encoder and a decoder, at least one of which implements a respective encoding or decoding based on a corresponding encoder machine-learning network or a decoder machine-learning network that has been trained, by determining a rate of change of an objective function relative to variations in the encoder machine-learning network or the decoder machine-learning network upon processing one or more training signals, to respectively encode or decode information over a communication channel;
    determining first information;
    using the encoder to process the first information and generate a first radio frequency (RF) signal;
    transmitting, by at least one transmitter, the first RF signal through the communication channel;
    receiving, by at least one receiver, a second RF signal that represents the first RF signal altered by transmission through the communication channel; and
    using the decoder to process the second RF signal and generate second information as a reconstruction of the first information.

2. The method of claim 1, further comprising:
    determining feedback information that indicates at least one of (i) a measure of distance between the second information and the first information, or (ii) channel state information regarding the communication channel; and
    updating at least one of the encoder or the decoder based on the feedback information.

3. The method of claim 2, wherein updating at least one of the encoder or the decoder based on the feedback information further comprises:
    determining a channel mode, from among a plurality of channel modes, that represents a state of the communication channel based on the feedback information; and
    updating at least one of the encoder or the decoder based on the channel mode of the communication channel.

4. The method of claim 3, wherein the plurality of channel modes corresponds to channel conditions including one or more of level of noise, signal-to-noise ratio (SNR), delay spread, or time scale of channel variations.

5. The method of claim 4, wherein the time scale of channel variations is based on one or more of a characteristic of a channel environment, a speed of movement of environmental objects, or location of additional radio emitters in a neighborhood of the channel.

6. The method of claim 5, wherein the characteristic of the channel environment includes whether the environment is rural, urban, or in a spacecraft, and
    wherein the speed of movement of environmental objects corresponds to channel coherence time or correlation time of channel statistics.

7. The method of claim 3, wherein determining the channel mode and updating at least one of the encoder or the decoder based on the channel mode comprises:
    providing the feedback information to a transmission mode controller;
    selecting, by the transmission mode controller, the channel mode from the plurality of channel modes based at least on the feedback information; and updating the encoder or the decoder using a respective set of encoding or decoding techniques that correspond to the selected channel mode.

8. The method of claim 1, wherein the encoder implements an encoding mapping that is based on results of training an encoder machine-learning network and the decoder implements a decoding mapping that is based on results of training a decoder machine- learning network, wherein the encoder machine-learning network and the decoder machine-learning network have been jointly trained as an auto-encoder to learn communication over a communication channel.

9. The method of claim 1, further comprising:
processing the first RF signal to generate a first analog RF waveform;
using one or more transmit antennas to transmit the first analog RF waveform over the communication channel;
using one or more receive antennas to receive a second analog RF waveform that represents the first analog RF waveform having been altered by the communication channel; and
processing the second analog RF waveform to generate the second RF signal.

10. The method of claim 1, wherein determining the rate of change of the objective function upon processing one or more training signals comprises:
determining a measure of distance between an input training signal and an output training signal that corresponds to a representation of the input training signal altered by transmission through a communication channel model; and
determining the objective function using the measure of distance.

11. The method of claim 1, wherein processing the first information using the encoder to generate the first RF signal comprises:
accessing, by the encoder, a lookup table that corresponds to encoding mappings learned during training the encoder using the encoder machine-learning network; and
mapping the first information to the first RF signal using the lookup table.

12. A system comprising:
at least one processor; and
at least one computer memory coupled to the at least one processor having stored thereon instructions which, when executed by the at least one processor, cause the at least one processor to perform operations comprising:
determining an encoder and a decoder, at least one of which implements a respective encoding or decoding based on a corresponding encoder machine-learning network or a decoder machine-learning network that has been trained, by determining a rate of change of an objective function relative to variations in the encoder machine-learning network or the decoder machine-learning network upon processing one or more training signals, to respectively encode or decode information over a communication channel;
determining first information;
using the encoder to process the first information and generate a first RF signal;
transmitting, by at least one transmitter, the first RF signal through the communication channel;
receiving, by at least one receiver, a second RF signal that represents the first RF signal altered by transmission through the communication channel; and
using the decoder to process the second RF signal and generate second information as a reconstruction of the first information.

13. The system of claim 12, wherein the operations further comprise:
determining feedback information that indicates at least one of (i) a measure of distance between the second information and the first information, or (ii) channel state information regarding the communication channel; and
updating at least one of the encoder or the decoder based on the feedback information.

14. The system of claim 13, wherein updating at least one of the encoder or the decoder based on the feedback information further comprises:
determining a channel mode, from among a plurality of channel modes, that represents a state of the communication channel based on the feedback information; and
updating at least one of the encoder or the decoder on the channel mode of the communication channel.

15. The system of claim 14, wherein the plurality of channel modes corresponds to channel conditions including one or more of level of noise, signal-to-noise ratio (SNR), delay spread, or time scale of channel variations.

16. The system of claim 15, wherein the time scale of channel variations is based on one or more of a characteristic of a channel environment, a speed of movement of environmental objects, or location of additional radio emitters in a neighborhood of the channel.

17. The system of claim 16, wherein the characteristic of the channel environment includes whether the environment is rural, urban, or in a spacecraft, and
wherein the speed of movement of environmental objects corresponds to channel coherence time or correlation time of channel statistics.

18. The system of claim 14, wherein determining the channel mode and updating at least one of the encoder or the decoder based on the channel mode comprises:
providing the feedback information to a transmission mode controller;
selecting, by the transmission mode controller, the channel mode from the plurality of channel modes based at least on the feedback information; and
updating the encoder or the decoder using a respective set of encoding or decoding techniques that correspond to the selected channel mode.

19. The system of claim 13, wherein the encoder implements an encoding mapping that is based on results of training an encoder machine-learning network and the decoder implements a decoding mapping that is based on results of training a decoder machine- learning network,
wherein the encoder machine-learning network and the decoder machine-learning network have been jointly trained as an auto-encoder to learn communication over a communication channel.

20. The system of claim 13, wherein the operations further comprise:
processing the first RF signal to generate a first analog RF waveform;
using one or more transmit antennas to transmit the first analog RF waveform over the communication channel;
using one or more receive antennas to receive a second analog RF waveform that represents the first analog RF waveform having been altered by the communication channel; and processing the second analog RF waveform to generate the second RF signal.

21. The system of claim 12, wherein determining the rate of change of the objective function upon processing one or more training signals comprises:
   determining a measure of distance between an input training signal and an output training signal that corresponds to a representation of the input training signal altered by transmission through a communication channel model; and
   determining the objective function using the measure of distance.

22. The system of claim 12, wherein processing the first information using the encoder to generate the first RF signal comprises:
   accessing, by the encoder, a lookup table that corresponds to encoding mappings learned during training the encoder using the encoder machine-learning network; and
   mapping the first information to the first RF signal using the lookup table.

23. At least one non-transitory computer-readable medium storing instructions that, when executed, cause at least one processor to perform operations comprising:
   determining an encoder and a decoder, at least one of which is configured to implements a respective encoding or decoding that is based on at least one of an a corresponding encoder machine-learning network or a decoder machine-learning network that has been trained, by determining a rate of change of an objective function relative to variations in the encoder machine-learning network or the decoder machine-learning network upon processing one or more training signals, to respectively encode or decode information over a communication channel;
   determining first information;
   using the encoder to process the first information and generate a first RF signal;
   transmitting, by at least one transmitter, the first RF signal through the communication channel;
   receiving, by at least one receiver, a second RF signal that represents the first RF signal altered by transmission through the communication channel; and
   using the decoder to process the second RF signal and generate second information as a reconstruction of the first information.

* * * * *

UNITED STATES PATENT AND TRADEMARK OFFICE
CERTIFICATE OF CORRECTION

| | | |
|---|---|---|
| PATENT NO. | : 11,423,301 B2 | |
| APPLICATION NO. | : 16/281246 | |
| DATED | : August 23, 2022 | |
| INVENTOR(S) | : Timothy James O'Shea | |

It is certified that error appears in the above-identified patent and that said Letters Patent is hereby corrected as shown below:

In the Specification

At Column 1, Line 3, after the title, please insert the following section:
-- STATEMENT REGARDING FEDERALLY SPONSORED RESEARCH OR DEVELOPMENT
      This invention was made with government support under agreement HR0011-16-1-0002 awarded by U.S. Defense Advanced Research Projects Agency. The government has certain rights in the invention. --.

In the Claims

At Column 33, Line 8, In Claim 8, delete "machine- learning" and insert -- machine-learning --.

At Column 36, Line 3, In Claim 23, delete "an a" and insert -- a --.

Signed and Sealed this
Fourth Day of July, 2023

*Katherine Kelly Vidal*

Katherine Kelly Vidal
*Director of the United States Patent and Trademark Office*

Page 1 of 1